United States Patent
Fuchs

(10) Patent No.: US 10,747,571 B2
(45) Date of Patent: Aug. 18, 2020

(54) SYSTEMS AND METHODS OF IMPROVING PARALLEL FUNCTIONAL PROCESSING

(71) Applicant: SALESFORCE.COM, INC., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 260 days.

(21) Appl. No.: 15/966,149

(22) Filed: Apr. 30, 2018

(65) Prior Publication Data

US 2018/0246754 A1    Aug. 30, 2018

Related U.S. Application Data

(63) Continuation of application No. 14/822,773, filed on Aug. 10, 2015, now Pat. No. 9,990,223.

(51) Int. Cl.
    *G06F 9/46*      (2006.01)
    *G06F 9/50*      (2006.01)

(52) U.S. Cl.
    CPC .............. *G06F 9/46* (2013.01); *G06F 9/5066* (2013.01)

(58) Field of Classification Search
    CPC ................................ G06F 9/46; G06F 8/443
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,092,083 A | 7/2000 | Brodersen |
| 6,161,149 A | 12/2000 | Achacoso |

(Continued)

OTHER PUBLICATIONS

Spivak, David I., Category Theory for the Sciences 5.1.1 (2014) pp. 204-234.

(Continued)

*Primary Examiner* — Etienne P Leroux
(74) *Attorney, Agent, or Firm* — Morris & Kamlay LLP

(57) ABSTRACT

The technology disclosed relates to improving parallel functional processing using abstractions and methods defined based on category theory. In particular, the technology disclosed provides a range of useful categorical functions for processing large data sets in parallel. These categorical functions manage all phases of distributed computing, including dividing a data set into subsets of approximately equal size and combining the results of the subset calculations into a final result, while hiding many of the low-level programming details. These categorical functions are extraordinarily well-ordered and have a sophisticated type system and type inference, which allows for generating maps and reducing them in an elegant and succinct way using concise and expressive programs that can significantly efficientize a whole software development process.

20 Claims, 12 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,772,229 B1 | 8/2004 | Achacoso |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,062,502 B1 | 6/2006 | Kesler |
| 7,069,231 B1 | 6/2006 | Cinarkaya |
| 7,069,497 B1 | 6/2006 | Desai |
| 7,181,758 B1 | 2/2007 | Chan |
| 7,289,976 B2 | 10/2007 | Kihneman |
| 7,340,411 B2 | 3/2008 | Cook |
| 7,356,482 B2 | 4/2008 | Frankland |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis |
| 7,620,655 B2 | 11/2009 | Larsson |
| 7,698,160 B2 | 4/2010 | Beaven |
| 7,779,475 B2 | 8/2010 | Jakobson |
| 7,851,004 B2 | 12/2010 | Hirao |
| 8,014,943 B2 | 9/2011 | Jakobson |
| 8,015,495 B2 | 9/2011 | Achacoso |
| 8,032,297 B2 | 10/2011 | Jakobson |
| 8,073,850 B1 | 12/2011 | Steven |
| 8,082,301 B2 | 12/2011 | Ahlgren |
| 8,095,413 B1 | 1/2012 | Beaven |
| 8,095,594 B2 | 1/2012 | Beaven |
| 8,209,308 B2 | 6/2012 | Rueben |
| 8,209,333 B2 | 6/2012 | Hubbard |
| 8,275,836 B2 | 9/2012 | Douglas |
| 8,457,545 B2 | 6/2013 | Chan |
| 8,484,111 B2 | 7/2013 | Sturgeon |
| 8,490,025 B2 | 7/2013 | Jakobson |
| 8,504,945 B2 | 8/2013 | Jakobson |
| 8,510,045 B2 | 8/2013 | Rueben |
| 8,510,664 B2 | 8/2013 | Rueben |
| 8,566,301 B2 | 10/2013 | Rueben |
| 8,646,103 B2 | 2/2014 | Jakobson |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter |
| 2002/0072951 A1 | 6/2002 | Lee |
| 2002/0082892 A1 | 6/2002 | Raffel et al. |
| 2002/0129352 A1 | 9/2002 | Brodersen |
| 2002/0140731 A1 | 10/2002 | Subramaniam |
| 2002/0143997 A1 | 10/2002 | Huang |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachadran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0120675 A1 | 6/2003 | Stauber |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0204427 A1 | 10/2003 | Gune |
| 2003/0206192 A1 | 11/2003 | Chen |
| 2003/0225730 A1 | 12/2003 | Warner |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0128001 A1 | 7/2004 | Levin |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes-Leon |
| 2004/0199543 A1 | 10/2004 | Braud |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0050555 A1 | 3/2005 | Exley |
| 2005/0091098 A1 | 4/2005 | Brodersen |
| 2006/0021019 A1 | 1/2006 | Hinton |
| 2008/0249972 A1 | 10/2008 | Dillon |
| 2009/0063415 A1 | 3/2009 | Chatfield |
| 2009/0100342 A1 | 4/2009 | Jakobson |
| 2009/0177744 A1 | 7/2009 | Marlow |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson |
| 2012/0290407 A1 | 11/2012 | Hubbard |
| 2013/0212497 A1 | 8/2013 | Zelenko |
| 2013/0247216 A1 | 9/2013 | Cinarkaya |
| 2014/0115560 A1 | 4/2014 | Hutchison |
| 2016/0110176 A1* | 4/2016 | Fink .................. G06F 8/443 717/137 |

OTHER PUBLICATIONS

MacLane, Saunders, Categories for the Working Mathematician, VII (2nd 1998) pp. 161-190.

Barr et al., "Category Theory for Computing Science," Les Publications CRM, Montreal; Third Edition, 1998, pp. 556.

(56) References Cited

OTHER PUBLICATIONS

Wlaschin, Scott, "Monoids without tears—A mostly mathless discussion of a common functional pattern," F# for Fun and Profit, 2012, <http://fsharpforfunandprofit.com/posts/monoidswithouttears/> retrieved Jul. 7, 2015, pp. 15.

* cited by examiner

SYSTEMS AND METHODS OF IMPROVING PARALLEL FUNCTIONAL PROCESSING

TECHNICAL FIELD

The technology disclosed relates generally to using category theory as a framework of improving parallel functional processing, and in particular to using categorical functions to improve parallel functional processing in distributed computing frameworks.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves can also correspond to implementations of the technology disclosed.

Category theory is well developed branch of mathematics and has been applied in many domains. In particular, it has been applied in situations where logical structure needs to be understood and modified. It has also been applied as a foundation for a programming paradigm known as functional programming.

At its foundation, category theory is used to formalize mathematical structure and its concepts as a collection of objects (also called nodes) and arrows (also called morphisms).

Category theory can be used to formalize concepts of other high-level abstractions such as set theory, ring theory, and group theory. Several terms used in category theory, including the term "morphism", differ from their use in mathematics. In category theory, "morphism" obeys a set of conditions specific to category theory itself. Thus, care must be taken to understand the context in which statements are made.

In category theory, a category has two basic properties: the ability to compose the arrows associatively and the existence of an identity arrow for each object. One example of a category is the category of sets, where the objects are sets and the arrows are functions from one set to another. However, the objects of a category need not be sets, and the arrows need not be functions. Accordingly, any way of formalizing a mathematical concept such that it meets the basic conditions on the behavior of objects and arrows is a valid category, and all the results of category theory will apply to it.

The "arrows" of category theory are often said to represent a process connecting two objects, or in many cases a "structure-preserving" transformation connecting two objects. The most important property of the arrows is that they can be "composed", in other words, arranged in a sequence to form a new arrow.

Categories now appear in most branches of mathematics, some areas of theoretical computer science where they can correspond to types, and mathematical physics where they can be used to describe vector spaces. Categories were first introduced by Samuel Eilenberg and Saunders Mac Lane around 1942-45 in connection with algebraic topology. Categories were specifically designed to bridge what may appear to be two quite different fields: topology and algebra.

MapReduce is a programming model and an associated implementation for processing and generating large data sets with a parallel, distributed algorithm on a cluster. Conceptually similar approaches have been very well known since 1995 with the Message Passing Interface standard having reduce and scatter operations. These all trace back to functional programming where map and various reduce operators (such as fold) are ubiquitous.

A MapReduce program is composed of a Map( ) procedure that performs filtering, transformation, key generation, a Shuffle( ) procedure that does sorting on the keys (such as sorting students by first name into queues, one queue for each name) and a Reduce( ) procedure that performs a summary operation (such as counting the number of students in each queue, yielding name frequencies). The MapReduce system orchestrates the processing by marshalling the distributed servers, running the various tasks in parallel, managing all communications and data transfers between the various parts of the system, and providing for redundancy and fault tolerance.

MapReduce libraries have been written in many programming languages, with different levels of optimization. A popular open-source implementation that has support for distributed shuffles is part of Hadoop. The name MapReduce originally referred to a proprietary Google technology, but has since been genericized.

Functional programming treats computation as the evaluation of mathematical functions over values and avoids changing-state and mutable data. Every fragment of code evaluates a particular value and always evaluates the same value. Scala is a programming language that integrates features of object-oriented and functional programming languages. In Scala, every value is an object, every object is a value, and every function returns a value. While Scala does not prevent the use of mutable data, it does not require it.

Hadoop is a framework that allows for the distributed processing of large data sets across clusters of computers using simple programming models. Spark is an enhanced variant of Hadoop and serves as an accelerator for the next generation of MapReduce. Scala can be used to take advantage of the parallel processing inherent in a Hadoop framework.

BRIEF DESCRIPTION OF THE DRAWINGS

The included drawings are for illustrative purposes and serve only to provide examples of different structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

DETAILED DESCRIPTION

Figure 1:
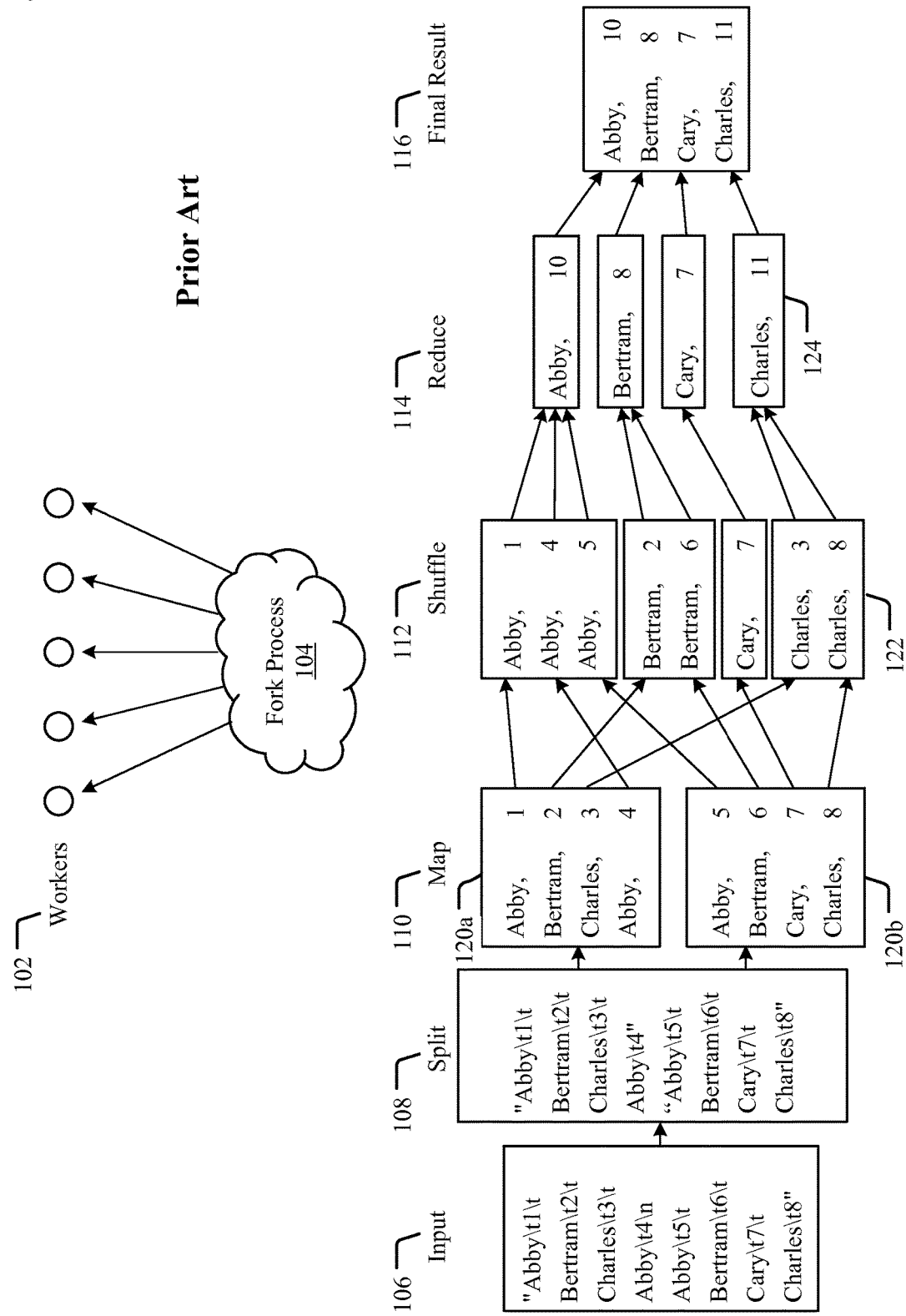
FIG. 1 illustrates one implementation of a MapReduce pipeline.

The following detailed description is made with reference to the technology disclosed. Implementations are described to illustrate the technology disclosed, not to limit its scope, which is defined by the claims. Those of ordinary skill in the art will recognize a variety of equivalent variations on the description.

INTRODUCTION

The technology disclosed relates to improving parallel functional processing using abstractions and methods defined based on category theory. In particular, the technology disclosed provides a range of useful categorical functions for processing large data sets in parallel. These categorical functions manage all phases of distributed computing, including dividing a data set into subsets of approximately equal size and combining the results of the subset calculations into a final result, while hiding many of the low-level programming details. These categorical functions are extraordinarily well-ordered and have a sophisticated type system and type inference, which allows for generating maps and reducing them in an elegant and succinct way using concise and expressive programs that can significantly efficientize a whole software development process.

Existing application programming interfaces (APIs) for distributed computing solutions like MapReduce™, Apache Spark™, Apache Yarn™, Apache Hive™, Apache Shark™, Apache Storm™, or Tez™ are very low-level and difficult to use because of their highly invasive and inflexible nature. In addition, they require special expertise and challenging programming to implement algorithms and to obtain good performance. Other limitations include tedious and verbose programming idioms, framework boilerplates, and serialization formatting. Overall, existing distributed computing APIs require unnecessary attention to a lot of details that are unrelated to the actual algorithm being implemented and prevent emergence of the actual algorithm.

Furthermore, existing distributed computing solutions that combine category theory with functional programming fall short on the social aspects of software development because they are not simple enough to be usable by non-expert programmers. As a result, such solutions often fail because the development teams find them too difficult to understand and maintain for the full life cycle of code.

Therefore, an opportunity arises to write distributed computing applications using high-order and anonymous categorical functions that are straightforward, intuitive, scalable, and easily codable in a number of programming languages. Evolution from lengthy and tedious programs to simple scripts may result.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

Category Theory is a branch of mathematics that has been applied in theoretical computer science to a handful of programming languages such as Haskell, Scala, and Charity. Category theory defines relationships within and between categories. A category is an algebraic structure represented as a directed graph consisting of objects that are the nodes of the graph and morphisms that are the edges between the nodes and are represented by arrows. One exception is an empty category, which has no objects or morphisms. As a convention, objects are in upper case, while morphisms are in lower case. The following are examples of categorical composition and associative principles of category theory and are always true:

Morphisms compose: given objects A, B, and C, and morphisms f:A→B, and g:B→C, there exists a morphism h:A→C, which has as its source the source of the first morphism f (A) and has as its target the target of the second morphism g (C). Execution of morphism h returns the same results as first executing morphism f, then executing morphism g. In this way, the morphisms g∘f (read "g after f") "compose into" the morphism h.

Morphisms are associative: (h∘g) ∘f=h∘(g∘f).

For each object there is an identity morphism called "id", or "idA" for the identity of A. Given f:A→B, then f°$_{idA}$=$_{idB}$°f=f.

Mathematics defines a large number of categories, the most famous being the category of sets and the functions between them. But there are also many other categories such as groups and group homomorphisms, rings, and topological spaces. The technology disclosed presents a method structure based on category theory, which has a direct computational component and which makes programming tasks relatively transparent to application programmers. Specifically, the defined operations can produce reusable components for performing MapReduce tasks that can be translated into any programming language. And these reusable components can be assembled into a set of modules applicable to a graphically-oriented development environment where programs are composed of objects and morphisms. Since such components and modules can be easily maintained by the system, the pre-defined objects and morphisms can be easily incorporated by the programmers in a variety of applications. New code will be only required on a need basis when existing constructions are found to be inadequate.

MapReduce has become a widespread programming paradigm for a variety of parallel computational tasks, such as machine learning and analytics. MapReduce is implemented in a variety of languages such as Scala, Erlang, Pig, and Java. The specific category theory constructs applicable to MapReduce are monoids, free monoids, fibres, functors, monads, products, and sums, including their duals where appropriate.

The technical solution disclosed herein provides a straightforward representation of MapReduce-style programming in category theory which:

provides a platform-agnostic representation of the algorithm, which can then be executed on different platforms without changes to the code, represents MapReduce in a natural way, has a straightforward graphical representation (borrowed from category theory) that is type-safe by construction, and by abstracting away from platform and language (category theory has been called a syntax-less language), can support optimizations.

Figure 2:
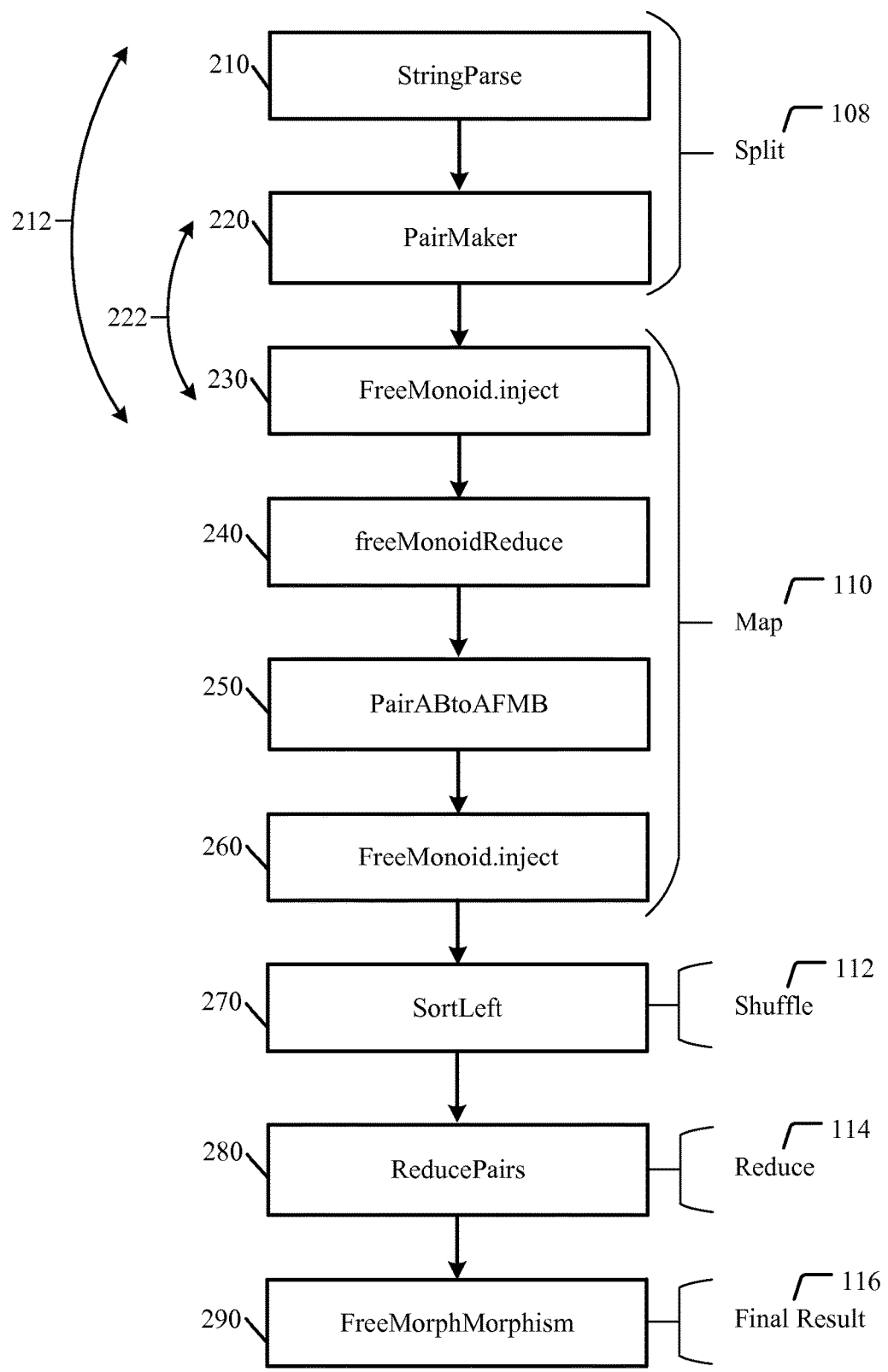
FIG. 2 illustrates one implementation of a MapReduce pipeline mapped to the technology disclosed.
Figure 3:
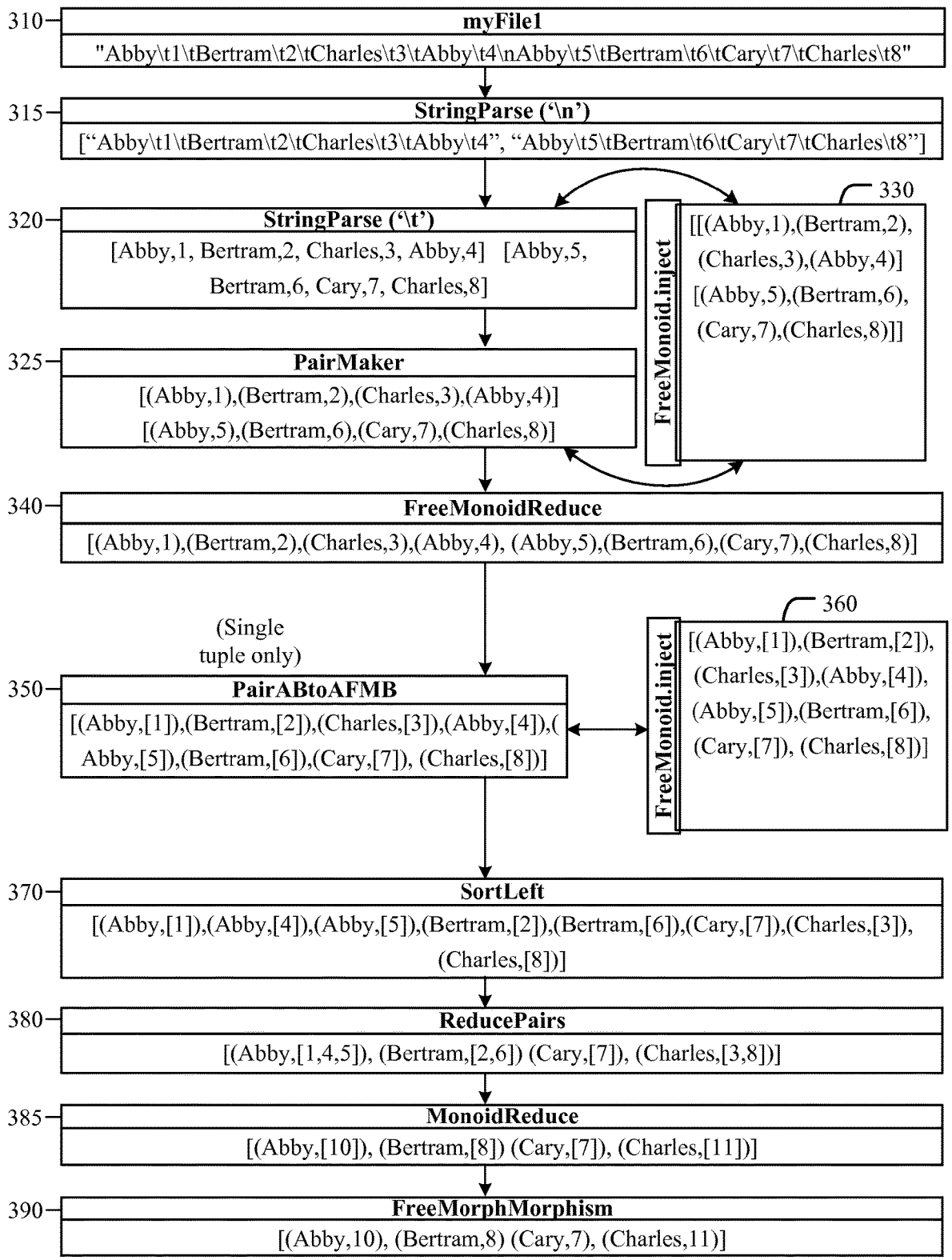
FIG. 3 is an illustration of manipulation of data structures according to one implementation of the technology disclosed.

The following discussion of FIGS. 1-3 uses a classic word count task as an example to distinguish processing of the task by existing MapReduce solutions from its processing by the technology disclosed. In other implementations, different input data can be used, instead of or in combination with the word count task, including financial data, IT data, business data, and others.

FIG. 1 illustrates one implementation of a MapReduce pipeline applied to a word count task. This example comprises input 106, split 108, map 110, shuffle 112, reduce 114, and final result 116 phases. In this example, the input 106 phase is represented by an input file. In other implementations, this can be a set of files in a Hadoop Distributed File System (HDFS). During the split 108 phase, and the key to massive parallelization in the map 110 phase, the MapReduce system splits the input 106 into a number of splits equal to (or greater than) the number of workers 102 assigned to the map 110 phase. In this example, the input data is split into two splits 108 identified as two separate strings. In another implementation, the splits can comprise subsets of files in the HDFS, such as one HDFS directory node per split. The MapReduce library of the user program can perform the split 108. The form of the resulting split can be specific to the location and form of the input data. MapReduce also allows the use of custom readers to split a collection of inputs 106 into splits based on the specific format of the input 106 files.

The number of workers assigned to the map 110 phase is a subset of the total number of workers 102. The total number of workers 102 is a function of the number of processors available as well as the number of threads defined per processor. Workers 102 can be distributed to processors near the data they are to process so that network bandwidth requirements are minimized. The worker 102 assignments are managed by the master fork process 104. The master fork process 104 also assigns workers 102 to shuffle phase 112 and reduce jobs 114. These assignments can be statically defined before processing begins, or can be dynamically allocated during processing, depending on the underlying MapReduce architecture.

The master fork process 104 then assigns (instantiates) workers 102 to the splits where the data resides to create the map output files 120a and 120b, collectively known as 120. In this example, one map 110 output file is created by each assigned worker 102 for each of the two splits. The assigned workers 102 can discard any irrelevant data found in each split 108, which can substantially improve the performance of subsequent steps.

The master fork process 104 then assigns a worker 102 to each map output file 120 to perform the shuffle phase 112. In this example, the result of the shuffle phase 112 is a set of shuffle output files, collectively labelled as 122. Each shuffle output file 122 contains one or more records with one key, and all of the values associated with that key. This can require movement of the data within the map output files 120 to a common storage area for each key so that they can be consolidated into shuffle output files 122 for the reduce phase 114.

The shuffle output files 122 are then assigned workers 102 for the reduce phase 114 so that an action, such as the summation of values with a shared key, or, for example, the average of all values with a shared key can be calculated. The two basic operations are sum and product, which can be combined into any number of complex arithmetic computations. The reducing worker 102 calls the reduce function once for each unique key. The result of the reduce phase 114 is a set of reduce output files 124, wherein each file is a key/value pair, the key in this example being a unique word from the input file 106, and the value being the number of times that word appears in the input file 106. The reduce output files 124 are then combined into a final result file 116.

The technology disclosed is capable of addressing all phases of MapReduce using categorical functions and operators that include free monoids, fibres, and co-fibres. At a high level, the Map phase of MapReduce corresponds to actions on a free monoid, while Reduce is one of reduction from the free monoid to the underlying set, reduction from the free monoid to another underlying set (such as from a fold), or a functor into the co-fibre category (e.g., the key of a key/value pair), or a reduction in the fibre. The reduction of this perspective involves implementing a few type classes. In one example implementation, a Scala program written based on the technology disclosed includes a construction phase when the necessary objects and morphisms are assembled and an execution phase when the morphisms operate on the various objects and create new objects. There are three basic traits for this, each with a default object.

Morphism, which has three categorical functions:

applic:A=>B: This the Morphism to an object of type A to reach an object of type B. This doesn't use Scala's "apply" as this only happens during the execution phase. The Scala "apply" is used during construction.

The infix operator "||" represents the composition of two Morphisms and creates a Compose object. This operator does not specify which node to use as the starting point for processing the composition.

The infix operator "@@" connects a (composition of) Morphism(s) to an object and creates a Path object that can actually be executed. The infix operator also specifies the starting and ending point for a path.

Compose represents the composition of Morphisms (or a Morphism and another Compose object). It extends Morphism and its "applic" function applies the constituents in order.

Path contains an object and a Morphism/Compose object. Its "eval" function applies the Morphism to the object. It also separates program construction from program execution.

There are no restrictions on object types, but there are a few types that are specially supported, such as monoids and free monoids. In the technology disclosed, various monoids are created. In addition, a number of free monoids can be created such as tokens, integers, pairs of tokens and integers, pairs of tokens and the free monoid of integers.

In one implementation, the MapReduce pipeline can be addressed using an instantiation of category theory based on the Scala programming language. In Scala, a trait specifies the signature of the supported methods. In contrast to classes, traits may not have constructor parameters. When using Spark, the java.io.serializable set allows for marshaling and un-marshaling as needed for remote objects, which allows the objects to be distributed to multiple parallel processors.

The technical solution disclosed herein also includes a number of functors, including injection and reduction between a set and its free monoid, from strings to Option [Int], and from anything to Unit (1). A functor is different from a morphism in that it links categories, rather than objects within a category, and preserves the morphisms of an object between categories. Put differently, functors are homomorphisms between categories that map objects to objects and morphisms to morphisms so that given a morphism f in a first category A and a functor F from the first category A to a second category B, F(A)→F(f)→F (B).

FIG. 2 illustrates one implementation of mapping 200 between the example MapReduce pipeline shown in FIG. 1 and the technology disclosed. FIG. 2 also demonstrates an example of a process flow of the technology disclosed. In this example, there are eight functions defined in the sample application based on category theory. Of the eight functions, six functions (230-290) are generic and can be applied to any MapReduce pipeline, while two functions (210 and 220) are customized and are specific to the data structure and the operations required on the input data 106. In the example show in FIG. 2, the StringParse categorical function 210 of the technology disclosed maps to the first part of the split 108. The second part of the split 108 maps to PairMaker categorical function 220, also called TupleMaker categorical function.

The map phase 110 maps to FreeMonoid.inject categorical function 230 and 260, freeMonoidReduce categorical function 240, and PairABtoAFMB categorical function 250, also called TupleWithList categorical function. SortLeft categorical function 270 of the technology disclosed maps to shuffle 112 phase. Reduce Pairs categorical function 280 maps to reduce 114 phase. Further, FreeMorphMorphism categorical function 290 also maps to final results 116.

The different categorical functions and operators of the technology disclosed are described using code. The code example below is in Scala, but can be translated or written using the technology disclosed in other programming language like Java, C++, C #, Visual Basic®, Matlab®, Java®, Python®, Perl®, Tcl, Ruby, PHP, JavaScript®, ML, Haskell, Lisp, Scheme, Erlang, Smalltalk, Objective-C®, Fortran, Cobol, or Pascal.

Double arrows 212 and 222 in FIG. 2 between StringParse categorical function 210 and FreeMonoid.Inject categorical function 230 and PairMaker categorical function 220 and FreeMonoid.Inject categorical function 230 represent higher order functionality of the FreeMonoid.Inject categorical function 230, which takes the StringParse categorical function 210 and PairMaker categorical function 220 as input.

Various code excerpts that demonstrate the word count task processing of FIG. 2 are described below:

Main

```
282  def wordCount0 = diskLocationForResults@@ (new
     FreeMorphMorphism(monoidReduce(IntAddMonoid)) ||
283    new ReducePairs[String,FreeMonoid[Int]](FreeMonoid.op) ||
284    new SortLeft ||
285    FreeMonoid.inject(new PairABtoAFMB) ||
286    new freeMonoidReduce ||
287    FreeMonoid.inject(new PairMaker[String,String,Int](id,(x => x.toInt)) ||
288    new StringParse('\t')) ||
289    new StringParse('\n')) @@ myFile1
```

In Scala programming language, composition occurs from left to right, and application occurs from right to left. Specifically, in the code above, the main function begins on line 282 and continues through line 289. On the far right, on line 289, is the identity of the input file called "myFile1", which is equivalent to input 106 and is defined in this example as an external file named "words.txt". In another example, input 106 can be a list of files from an HDFS, or other list of files. On the far left, on line 282, is the identity of the output location named "diskLocationForResults". The infix operator 1" is used for composition instead of the formula conventional open circle.

StringParse categorical function 210 and PairMaker categorical function 220 are specific to input 106, in some implementations. In other implementations of different distributed computing models, such as Apache Spark™, where the input is pre-tokenized or already split, StringParse categorical function 210 and PairMaker categorical function 220 are applied to a list of strings and are injected into the FreeMonoid.Inject categorical function 230. These categorical functions can be changed depending on the structure of the input data and on the data manipulations required. Given a graph, a path is an alternating sequence of nodes and edges starting at a first node and ending at a second node. The edges are a sequence of morphisms implemented as functions. The nodes are sets of objects manipulated by the functions. The "II" operator specifies the composition of one morphism from two separate morphisms, but not the starting or ending nodes. The "@@" grounds the sequence of morphisms with a starting and ending point so that the composed morphism can be evaluated.

In this example, categorical functions StringParse 210 and PairMaker 220 format the text to simulate a split 108 on an HDFS. This creates a composition of morphisms using various declarations and traits. Some of these declarations and traits are illustrated in the following code:

Infix Operators

```
15    def applic(x : A):B;
16    def ||[D](b : Morphism[D,A]):Compose[D,A,B] = Compose(b,this);
17    def @@(obj : Path[_,A]) = Path(this,obj)
18  }
```

Morphism

```
20  object Morphism {
21    def apply[A,B](f : A => B):Morphism[A,B] = new MorphismImpl[A,B](f);
22    private class MorphismImpl[A,B] (
23         val func : A => B
24    ) extends Morphism[A,B] {
25       def applic(x : A):B = func(x);
26    }
27  }
```

Compose

```
29  object Compose {
30    def apply[A,B,D](f:Morphism[A,B],g:Morphism[B,D]):Compose[A,B,D] = new ComposeImpl[A,B,D](f,g)
31       private class ComposeImpl[A,B,D] (
32          private var first:Morphism[A,B],
33          private var snd:Morphism[B,D]) extends Compose[A,B,D] {
34       def applic(x : A):D = snd.applic(first.applic(x))
35    }
36  }
```

The path defined by "@@" of line 17 is used with the input file 106 by the StringParse categorical function 210 to simulate the separation of the input file 106 into splits 118 for each worker 102. In this example, the input is separated by newline characters "\n". Any valid regular expression can be used as a delimiter in other implementations. An example of a StringParse class is described in the following code excerpt:

StringParse

```
221   class StringParse(
222      val regex : Char
223   ) extends Morphism1[String,FreeMonoid[String]](
224      (x => FreeMonoid(x.split(regex).toList))
225   );
```

In the code example above, the result of splitting the input file 106 into splits 118 according to the regex is stored as part of Morphism1 associated with a free monoid (list) called "FreeMonoid". The object Morphism1 becomes a structure with the input file 106 as a string object A, the list of splits 118 as a FreeMonoid (list) of Strings as object B, and the regex as the morphism f: A→B, with the Path incorporated into the composed morphism defined by the "@@" overloaded constructor. Accordingly, StringParse categorical function serves as an extension of Morphism1, which in turn is an extension of a Morphism:

Morphism 1

```
58    class Morphism1[A,B](
59       val func:A=>B
60    ) extends Morphism[A,B]{
61       override def applic(x : A):B = {
```

-continued

```
62          func(x)
63       }
64    }
```

FIG. 3 is an illustration of the manipulation 300 of data structures according to one implementation of the technology disclosed. A string within myFile1 310 is formatted to simulate a list of terms, such as a list of files from an HDFS directory. In this case, myFile1 310 is simplified to reduce the input to a list of words rather than a list of files containing words. This does not affect the processing within the composed morphism.

StringParse 315 with a regex of '\n' then splits the contents of myFile1 310 into two strings to simulate the contents of two different files, with each simulated file containing a list of words. The data is now ready to be processed by the technology disclosed. In other implementations of different distributed computing models, such as Apache Spark™, where the input is pre-tokenized or already split, StringParse categorical function 210 maps from string to FM[string] in the first morphism, resulting in further tokenization or splitting of the pre-tokenized string.

A first composed morphism can include the morphisms from FreeMonoid.inject categorical function 330 (line 287), PairMaker categorical function 325 (line 287), and String-Parse('\t') categorical function 320 (line 288). This morphism takes the two output strings of StringParse('\n') 315 and creates a free monoid over free monoid over tuples [[(string, int)]] as illustrated in 330. In particular, String-Parse categorical function 210 takes a string and returns a list of strings, represented as String=>FM[String]. PairMaker categorical function 220 takes a list of strings and returns a list of pairs, represented as FM[String]=>FM[(String,Int)]. The composition in this case can be represented as String=>FM[(String,Int)]. However the input, which is the output of the StringParse categorical function 210, is not a single string, it is a list of two strings, represented as FM[String]. FreeMonoid.Inject categorical function 230 takes the composition, which is String=FM[(String,Int)] and makes it FM[String]=>FM[FM[(String,Int)]] by applying a morphism (or composition of morphisms).

To begin the process, StringParse categorical function ('\t') 320 takes the output of StringParse('\n') 310 and splits it into tokens. These tokens are placed into a structure referred to as a free monoid of strings. As each token is extracted by StringParse('\t') 320 it is immediately passed to PairMaker categorical function 325. As PairMaker 325 completes each tuple, FreeMonoid.inject 330 injects the tuple into a free monoid over free monoid of tuples.

At this point, it will help to define some of the category theory concepts that are used to describe the processing steps used in the technology disclosed. A category of particular interest is a monoid. A monoid is an algebraic structure with a single binary associative operation and an identity element, formally, (M,e,*), where M is a set, e∈M is an identity element, and * is a function M×M→M such that the following monoid laws hold for all m, n, p∈M:

m*e=m
e*m=m
(m*n)*p=m*(n*p)

In the formulas above, "e" is referred to as the unit, or identity element and "*" is referred to as the binary associative operation for the monoid. A set of first two rules is called unit laws, which shows that any value of a set "associated" with the identity element of the set is equal to itself, regardless of the order of operation. For integer multiplication, the identity element is 1, since any value times 1 is equal to the value. For integer addition, the identity element is 0, since adding any value to zero is equal to the value. For the Boolean "And", the identity element is "True", since False AND True is False, and True AND True is True. For strings, the identity element is the empty set [ ], since "hello"+" "="hello".

The third rule is the associativity law for monoids, which indicates that maps between monoids are homomorphic.

A set can have more than one monoid—integers can have both an additive monoid with 0 as identity and a multiplicative monoid with 1 as identity. For example, a monoid can be a pair (M, *), where M is a non-empty set and "*" is a composition law. Two monoids (M, +) and (M, ·) can be used, where M=[0, 1], "+" is the sum, and "·" is the product. The application of the two monoids results in the following truth tables:

| + | 0 | 1 |
|---|---|---|
| 0 | 0 | 1 |
| 1 | 1 | 2 |

| · | 0 | 1 |
|---|---|---|
| 0 | 0 | 0 |
| 1 | 0 | 1 |

A monoid (M,*,e) is represented in category theory as a single object. Each member of M becomes an automorphism of the object to itself. The identity element, "e", is the identity morphism. Further, "*" represents composition.

The morphism results in the same data type as the data set in the original monoid to maintain associativity, which allows for extension of a pairwise operation into an operation that works on lists.

A free monoid is a generalization of a list. Given a set, such as all the letters or numbers, the free monoid over that set is the set of all finite sequences of elements from the set. The monoid identity is the empty set and the operation is concatenation. For example, given the set of integers, the free monoid over positive integers includes such items as [ ] (the empty list), [5] (a list with one element), and [23·5·94] (a list with three elements). Note that the dot is concatenation, not multiplication or addition.

A description of word count in categorical terms will be helpful. The first thing done is to take a set of words (or documents in the case of HDFS) and separate them into tokens 320.

Figure 11:
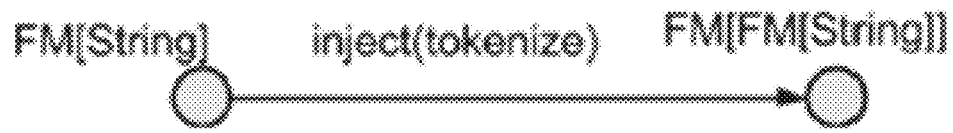
FIG. 11 shows a diagram of string tokenization.

The set of words in the input described in example 310 can be in any sequence for counting purposes. The set of words are a subcategory of the free monoid of strings, according to one implementation. Separating them into tokens again gives a free monoid, thereby providing the free monoid over the free monoid of strings, as shown in diagram below. Each of these, importantly, is commutative. FreeMonoid.inject categorical function 330 builds the free monoid over free monoid over strings, which is comparable to a list of list of strings. This allows lists of strings from different workers to be consolidated into a structure that lists all of the lists of strings. In the diagram below, an in-memory string (String) is split by line breaks (\n), which is represented as String=FM[String]. The split strings (String=FM[String]) include tabs (\t) between each of their words. When inject (tokenize) is executed, the strings are tokenized based on the tabs (\t) to produce tokens, which is represented as FM[String]=>FM[FM[(String,Int)]], as shown in FIG. 11.

Figure 12:
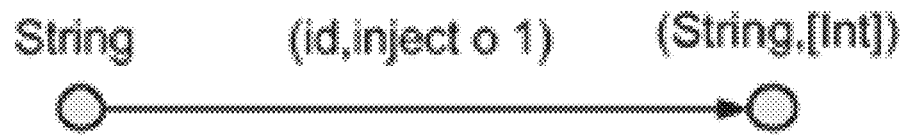
FIG. 12 shows a diagram of a functor moving a free monoid of strings to a free monoid of string tuples.

PairMaker categorical function 325 takes each pair of tokens, using the first token it receives from StringParse 320 as a key, and the second token of the pair as a value, and creates a tuple. In another implementation, StringParse 320 can use a white space for the regex. This would allow each token to be used as a key, and the integer '1' to be added as the value in the tuple, since each word has 1 as its identity. A functor is required to move a free monoid of strings to a free monoid of free monoid of tuples, as illustrated in FIG. 12:

PairMaker

PairMaker categorical function 220 is a functor from a free monoid of one type to a free monoid of pairs of some other types. It does this by iterating over the input free monoid two at a time, applying a function to each, and returning the pair. In its use here, the input is a list of strings where each oddly numbered string is a word and each even string is an integer. The pair represents a word and its count. As each word is encountered, a new pair is created with an updated word-to-count mapping by utilizing the "foldleft" monad illustrated in line 230:

```
226  class PairMaker[A,B,C] (
227     val i1 : A => B,
228     val i2 : A => C
229  ) extends Morphism1[FreeMonoid[A],FreeMonoid[Pair[B,C]]](
230     (x => FreeMonoid(x.underlying( ).foldLeft((None:Option[B],List[Pair[B,C]]( )))(
231        (mem,y) => mem._1 match {
232           case None => (Some(i1(y)),mem._2)
233           case Some(b) => (None,(b,i2(y))::mem._2)
234        }
235     )._2))
236  );
```

A monad is an abstract data type constructor of a monoid in the category of endofunctors. It is a structure that represents computations defined as a sequence of steps, and is described as "programmable semicolons". A monad consists of a type constructor and two operations, bind and return, where return is often also called unit. The return operation takes a value from a plain type and puts it into a monadic container using the constructor, creating a monadic value. The bind operation takes as its arguments a monadic value and a function from a plain type to a monadic value, and returns a new monadic value.

One important attribute of a monad is embedded error checking. In this example, if the input string is not empty, line 233 (case Some(b)) will assign the string to object B as the key, and will assign an integer to object C as the value within the FreeMonoid. This structure in Scala solves the problem of error tracking. For example, if the option type of 'none' on line 208 above, wherein the input string is empty, then you have an error, and you can't move forward without addressing it.

FreeMonoid.inject

FreeMonoid.inject categorical function 330 performs pipelining of StringParse('\t') 320 and PairMaker 325 to create the list of list of tuples. This is exemplified on lines 168 and 169 below. The code used to implement the process steps FreeMonoid.inject 230 through FreeMorphMorphism 290 are the same regardless of the morphisms described in the split 108 process.

Figure 5A:
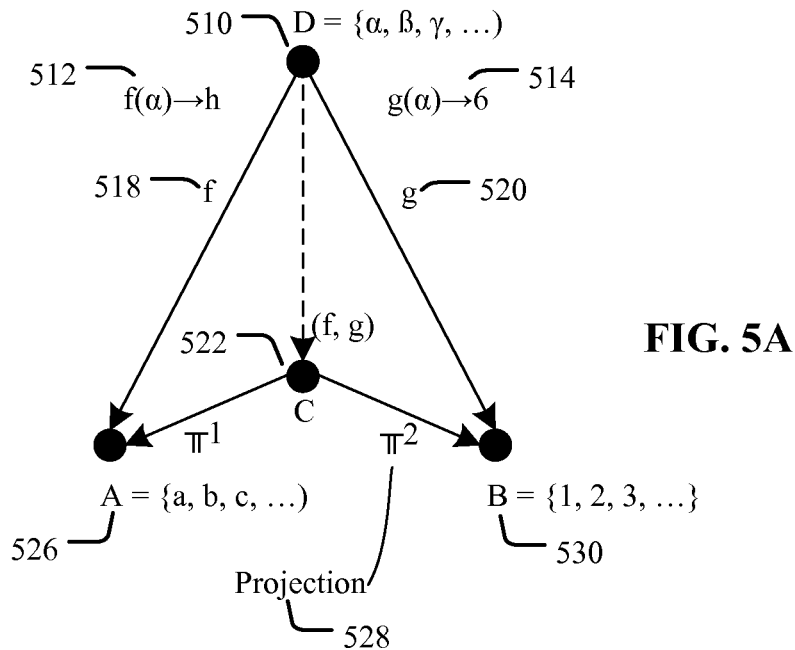
FIGS. 5A and 5B illustrate product projections and sum injections used in one implementation of the technology disclosed.
Figure 5B:
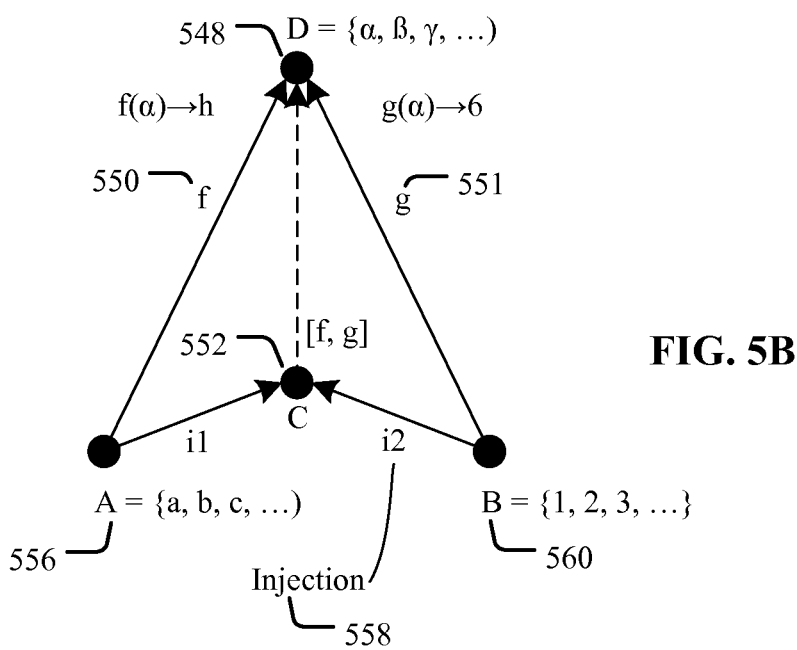

FIGS. 5A and 5B illustrates product projections and sum injections 500. Products and sums are the fundamental constituents of any manipulations on sets, and are associated with identity elements. As illustrated in FIG. 5A, a product can be a Cartesian product such that A 526×B 530 is equal to the pairs of each element in sets A 526 and B 530. For any A 526 and B 530, there is an object C 522 such that from C 522, there are two arrows called projections (π1, π2) 528 such that, if I have some other object (D 510), from which I also have morphisms f 518 and g 520 to A 526 and B 530 respectively, there is a morphism from D 510 to C 522 such that this diagram "commutes". In this example, commute means that f: D→B can also be obtained from the projection 528 of (f, g): D→C.

Suppose A 526 is the set of alphabet {a, b, c . . . }, and B 530 is the set of numbers {1, 2, 3, . . . }. Then C 522 is the set of pairs of alphabet and numbers {(a,1), (c, 2002), . . . }. D 510 is something that is a set of something else, (α, β, γ, . . . ). Also, f can be applied to alpha (f(α)) 512, and to get some other letter like h. And we can apply g to alpha (g(α)) 514, and get 6. There is a pair of morphisms, where f 518 applied to something in D 510 plus g 520 applied to something in D 510 equals something in C 522. D 510 can also be points in two dimensional space.

Suppose we have a category (like the category of sets, or the category of things that show up in computer programs) whose objects include the set of strings and the set of integers. If our category "has products", then it also has an

```
161  object FreeMonoid {
162     def apply[A](x : A):FreeMonoid[A] = new FreeMonoidImpl[A](List(x));
163     def apply[A](x : List[A]): FreeMonoid[A] = new FreeMonoidImpl[A](x);
164     def apply[A]( ):FreeMonoid[A] = new FreeMonoidImpl[A](List[A]( ));
165     def op[A](x : FreeMonoid[A], y : FreeMonoid[A]):FreeMonoid[A] = {
166        x.op(y);
167     }
168     def inject[A,B](f : Morphism[A,B])(implicit tag: ClassTag[B]):Morphism[FreeMonoid[A],FreeMonoid[B]] = {
169        FreeMonoid[A].inject(f);
170     }
171  }
```

Figure 4A:
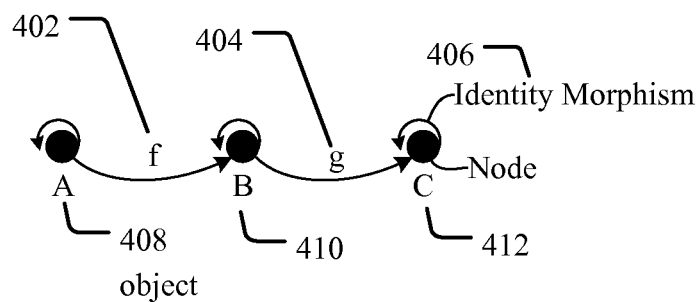
FIGS. 4A and 4B illustrate some of the category theory constructs used in the technology disclosed.
Figure 4B:
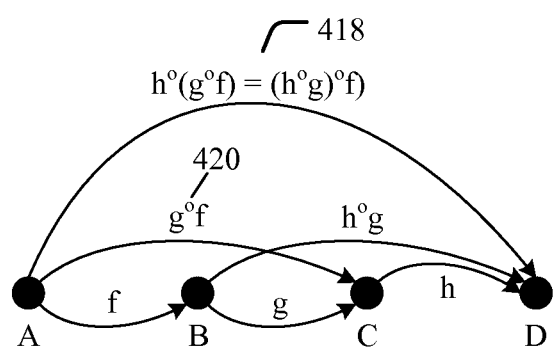

FIGS. 4A and 4B illustrate some of the category theory constructs 400 used in the technical solution disclosed herein. FIG. 4A is an illustration of objects A 408, B 410, and C 412 with morphisms "f" 402, "g" 404, and "idC" 406. The identity morphism 406 is shown as an almost-complete circle around its object.

The overloaded constructor "∥" within the core section of code, defined on line 16 above, composes the morphisms of StringParse 210, PairMaker 220, and FreeMonoid.inject 230 into a single morphism. This attribute of composition is evident in all subsequent process links, regardless of the data being processed. Composition is illustrated in FIG. 4B, where morphisms 'f' and 'g' can be composed into morphism g°f 420. FIG. 4B also illustrates the associative principle of morphisms, where (h°g°) f=h°(g°f) 418.

object (Strings×Integers), the set of ordered pairs of Strings and Integers, as illustrated in FIG. 5A. The product comes with two projection functions, π1 and π2 528, and given any other object in the category which has morphisms to both the set of Strings and the set of Integers (such as C 522, an example being the set of programs that halt, which has as f 518 the text of its code and as g 520 the Gödel number it calculates), there is a unique morphism from that object (shown here as (f,g)) such that the diagram commutes, i.e., π1 o<f,g>=f 518 and π2 o<f,g>=g 520.

In the word count example, the identity element of the monoid is 0, which indicates a summation function for integers. Sums are the duals of products, and are illustrated in FIG. 5B. Summation is indicated by the injections i1 and i2 558 of two different objects such as A 556 and B 560 into an object C 552 thereby creating a monoid with both the morphism 550 and the morphism 'g' 551. To create a dual, the projections ⊥1 and ⊥2 528 are changed to injections 558. So whatever C 552 is, it will be either an A 556, or a B 560. Because we know how to get from A 556 to D 548 over f 550 (through morphism f), and from B 560 to D 548 over g 551, then we know how to get from C 552 to D 548 by applying either f 550 or g 551 This is represented in programming languages, such as Haskell or Scala, as a case construct. In Scala, if some object, c, is of type A or B you have:

```
c match {
  case A(x) => f(x);
  case B(y) => g(y);
}
``` freeMonoidReduce

We now want to collect together all the examples of each token. Ideally, there is a functor which will take each item into the fibre category over strings. We then distribute the functor over our object, everything becomes subcategories of the category of monoids over strings. We then reduce in the new free monoid, which gives us a category which we can then convert to the fibre of integers over strings.

```
210 class freeMonoidReduce[A] extends
Morphism[FreeMonoid[FreeMonoid[A]],FreeMonoid[A]] {
211    override def applic(x : FreeMonoid[FreeMonoid[A]]):FreeMonoid[A] = {
212      x.reductio[A](x)
213    }
214 }
```

Figure 13:
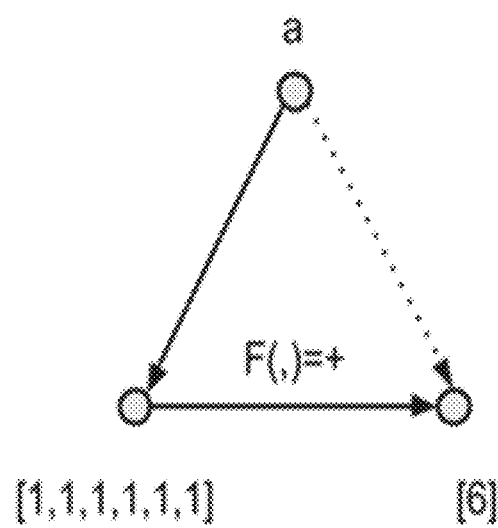
FIG. 13 shows a diagram of the reduction of a list of integers.

In another example, the co-fibre category is used, and is represented by division. Customarily, it is shown as a downward pointing arrow: ⇩. We apply a functor that takes a pair and transforms it into the co-fibre of the left side over the right, i.e., F (a,b)=>a/b, where the former is a pair and the latter a very small category. The functor F (.) maps to an operator that combines subcategories by applying the monoid operator of the upper category as the categories are combined. Finally, the lists of integers over the words are all reduced, as shown here and in FIG. 13:

$$[(a, [1]) \cdot (b, [1]) \cdot (a, [1])] \Rightarrow F[(a, [1]) \cdot (b, [1]) \cdot (a, [1])] \Rightarrow$$

Figure 14:
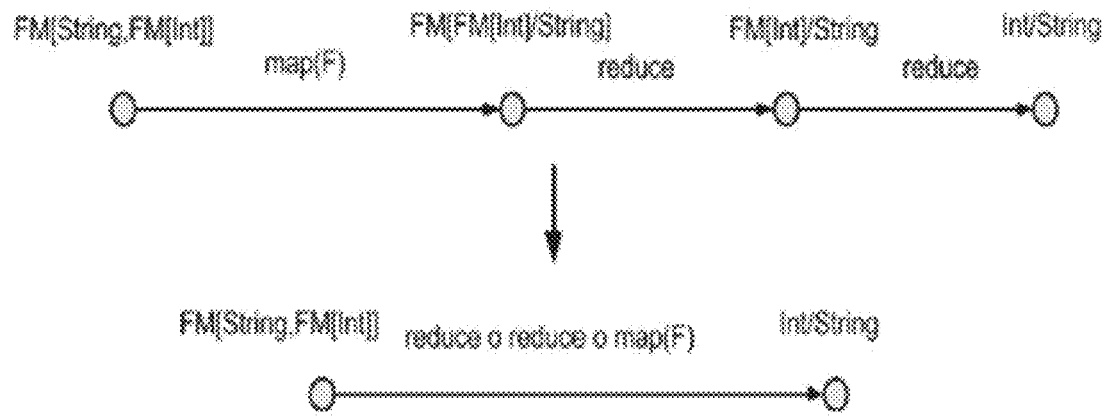
FIG. 14 shows another diagram of the reduction of a list of integers.

In another implementation, this can be diagrammatically represented as shown in FIG. 14.

Figure 15:
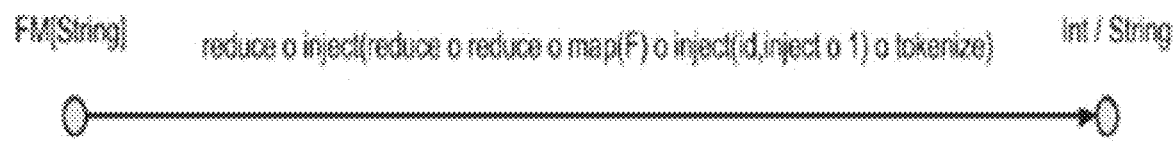
FIG. 15 shows a diagram of a functional program.

The value of the longer sequence is to show that we can prove the correctness of the sequence of operations. Because the types of all nodes are determined by the previous node(s) and the morphisms, all of the process steps we need to perform can be standardized. Other than tokenizing the inputs, every operation performed has been categorical in that it has been an application of some property of the relevant category—other than StringParse 210 and the initial part of PairMaker 220, all of the code written to perform processes 230 to 290 operate on the categories, so the code is entirely reusable. Each morphism is composed with the previous morphism, which creates a functional program as shown in FIG. 15.[[:]]

In some implementations, we can reduce the outer monoid and then fibrate, or fibrate locally and then reduce, as in the following diagram. This kind of "arrow chasing" is typical of category theoretic proofs. However when we go from correctness to cost, some paths become preferable to others. The result is the same, but, in the context of MapReduce or Spark, the second path represents summing locally then bringing together all the local results, while the first represents bringing all the data together before combining it. Summing locally would be generally preferred because less information is shipped.

In this example, the FreeMonoidReduce 340 module collapses the free monoid to the underlying structure, and outputs a data structure. It is generic to the type of free monoid, but in this case outputs [(Strint,Int)]. FreeMonoidReduce 340 can be implemented using fibres.

Figure 16:
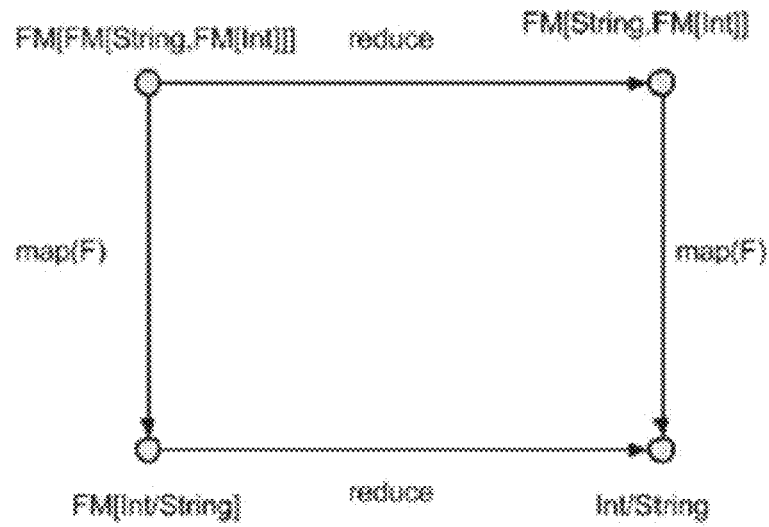
FIG. 16 shows a diagram of the reduction of an outer monoid.

As show in FIG. 16, in one implementation, a fibre can be implemented as a hash table that maps keys to values. In the word count example, each word can be a key, and each occurrence of the word can be linked by associative array. The associative array could then be "reduced" by the morphism which, in this case, would add them together. In other implementations, a fibre can be implemented as a linked list, hierarchical database, nested set, or other structure that allows processing of multiple values associated with a key.

Figure 6:
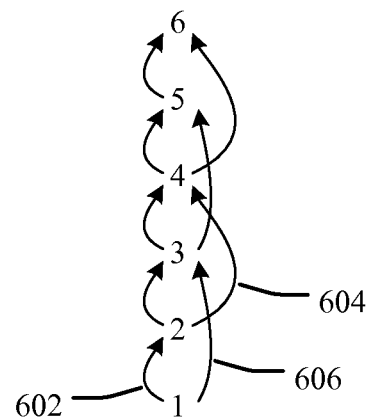
FIG. 6 illustrates compose-able morphisms, fibres, and functors used in one implementation of the technology disclosed.
Figure 6:
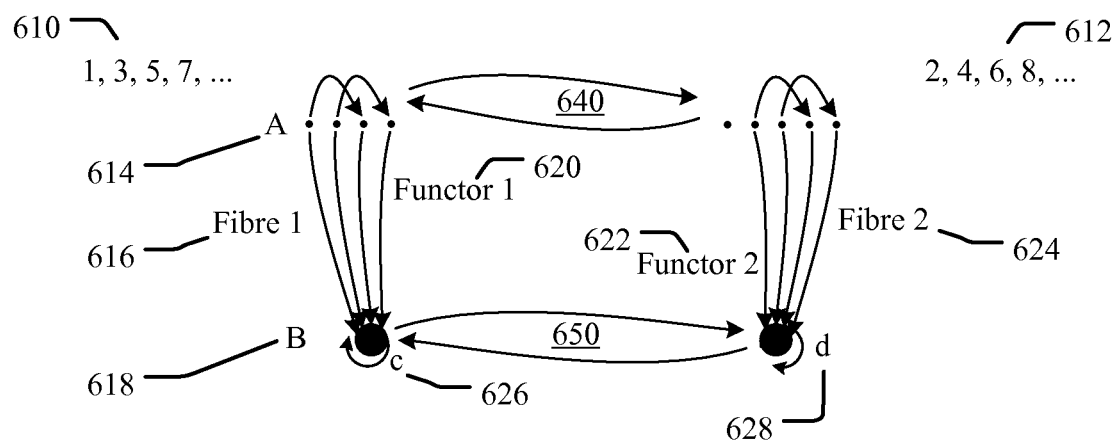

FIG. 6 is an illustration of one implementation of a fibre 600. Fibres are pairs of categories illustrated with category A 614 as the upper category and category B 618 the lower category, with a functor from A to B, so that every object in category A is over some object in B. In addition, every morphism in A is over a morphism in B. If two objects in A are over the same object in B, then morphisms between them map to endomorphisms in B. For instance, if object a1 is over object b1 and object a2 is over object b2, then a morphism from a1=>a2 maps to a morphism from b1=>b2. Further, category A 614 is the set of natural numbers without zero. This includes a successor morphism 602 that returns a subsequent integer. So, if n=1, the successor morphism 602 returns n=2. There is also a composed successor morphism 606, composed of two successor morphisms 602, that, beginning with n=1, returns subsequent odd numbers as a list 610. The composed successor morphism 604 is the same composed successor morphism as 606, but beginning at n=1, which returns subsequent even numbers as a list 612. These morphisms 604 and 606, collectively known as 640, create two pools of objects 610 and 612.

B is a category with two objects (c 626 and d 628) with a single morphism in each direction. In this example, one object can be labeled "Odd" and the other "Even", and the morphisms 650 "OddToEven" and "EvenToOdd".

The functor maps all the odd integers in category A to object c in category B and all the even integers to object d. Successor morphisms either go from an odd to and even or an even to an odd. Those going from odd to even are all mapped to the morphism from c to d, those going from even to odd are mapped to the morphism from d to c. All even length morphisms from an odd to an odd are mapped to the id_c and the others to id_d. Specifically, in FIG. 6, the functor 620 associates the composed successor morphism 606 with fibre 1 616, which creates an object c 626 in category B 618 that contains only odd numbers. The functor 622 also associates the composed successor morphism 604 with fibre 2 624, which creates an object d 628 in category B that contains only even numbers 612.

PairABtoAFMB

The PairABtoAFMB 350 module converts each tuple output by FreeMonoidReduce [(string, int)] to a tuple of free monoid of integer over the free monoid of string [(string, [int]).

```
100  class PairABtoAFMB[A,B] extends Functor[Pair[A,B],Pair[A,FreeMonoid[B]]] {
101    def foo(b : Pair[A,B] => Pair[A,B], a : (A,FreeMonoid[B])):(A,FreeMonoid[B]) = {
102      val in = (a._1, a._2.underlying( )(0))
103      val out = b.apply(in)
104      fObj(out)
105    }
106  }
```

FreeMonoid.inject

FreeMonoid.inject categorical function 360 performs pipelining of each tuple output from PairABtoAFMB 350 into a list of tuples of free monoid of integer over the free monoid of strings.

SortLeft

SortLeft categorical function 370 orders the list of keys created by FreeMonoid.inject 360 so that they can be merged into one instance per key.

```
237  class SortLeft[A <: String, B] extends
Morphism1[FreeMonoid[Pair[A,B]],FreeMonoid[Pair[A,B]]](
238    //(x => FreeMonoid(x.underlying( ).sortWith((a,b) => new StringOps(a._1.toString( )) < b._1.toString( ))))
239    (x => FreeMonoid(x.underlying( ).sortWith((a,b) => (a._1 < b._1))))
240    );
```

ReducePairs

ReducePairs categorical function 380, also called MonoidTuplesListMerge categorical function, is a monad that joins the keys into one instance of each key, with an array of values, the array having one entry for each occurrence of the key grouped by SortLeft 370.

```
259  class ReducePairs[A,B] (
260    val op : (B,B) => B
261    ) extends Morphism1[FreeMonoid[Pair[A,B]],FreeMonoid[Pair[A,B]]](
262      (x => FreeMonoid(foobar(op, x.underlying( ))))
263    );
```

MonoidReduce

MonoidReduce categorical function 385, also called MonoidTupleListEvalute categorical function, uses foldLeft function (line 218) to apply the monoid operator of summation to each array in each tuple, creating a new list of tuples, wherein each tuple comprises a key and an array with one element, the element being the total number of occurrences of the key word found by any worker 102.

```
215    def monoidReduce[A](monoid : Monoid[A]) =
216      new Morphism[FreeMonoid[A],A] {
217        override def applic(x : FreeMonoid[A]):A = {
218          x.underlying( ).foldLeft(monoid.unit)(monoid.op)
219        }
220      }
```

FreeMorphmorphism

The morphism of FreeMorphMorphism categorical function 390 modifies each tuple in the list of tuples in MonoidReduce 385 into a free monoid over pairs of strings. In this example, we now have a list consisting of simple tuples, where each word is the key to the tuple, and the number of times that key exists within the input data 106 is the value within the tuple.

```
264  class FreeMorphMorphism[A,B,C] (
265    val op : Morphism[B,C]
266    ) extends Morphism1[FreeMonoid[Pair[A,B]],FreeMonoid[Pair[A,C]]](
267    (x => FreeMonoid(x.underlying( ).map(x => (x._1, op.applic(x._2)))))
268        );
```

Figure 7:
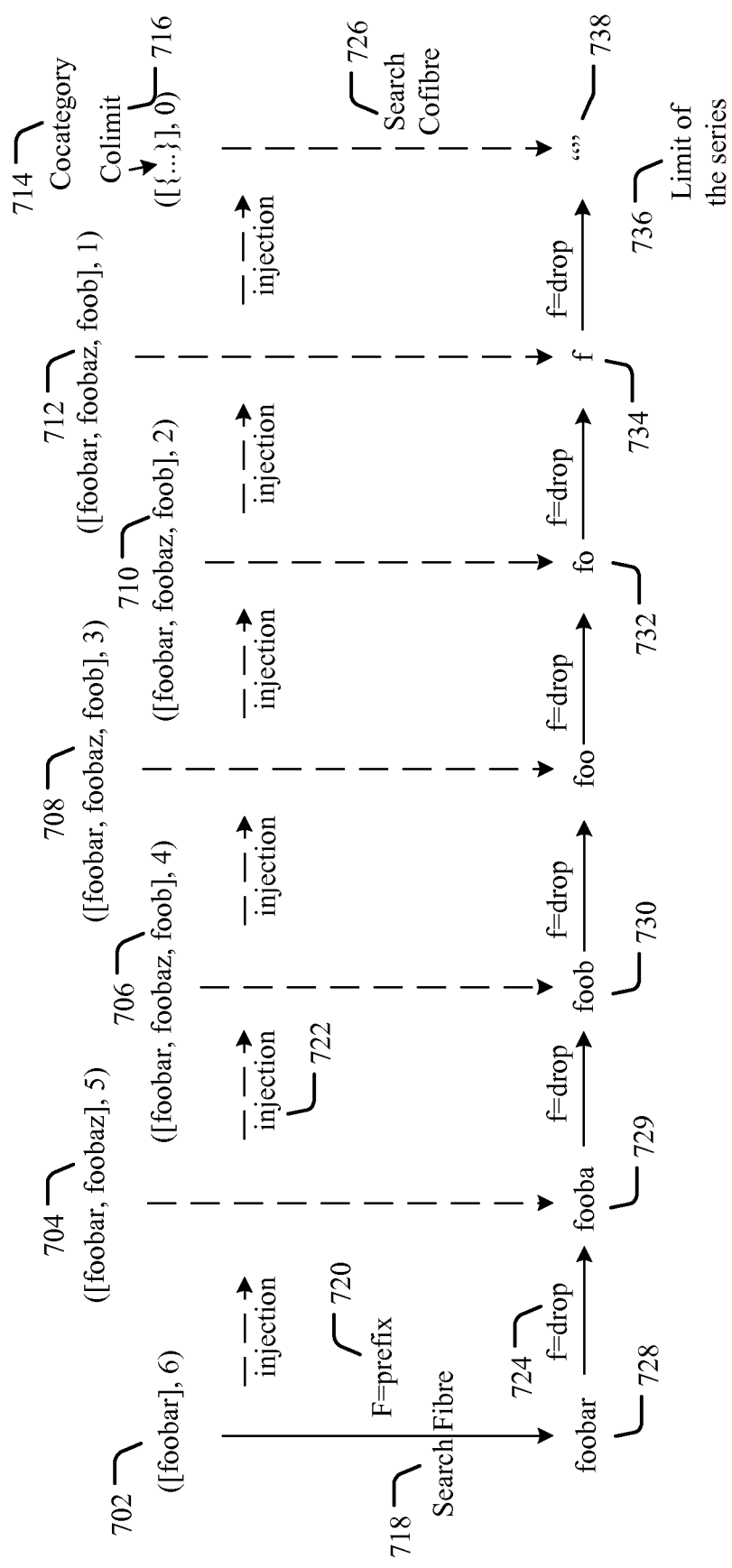
FIG. 7 illustrates one implementation of a word count pipeline that is processed using the technology disclosed.

In another implementation illustrated in FIG. 7, the technology disclosed can be used for a search application 700. In many search applications it is now common for the applications to suggest completions, called an "autosuggest" feature. For example if the user types "foob", the system may suggest "foobar" and "foobaz" as potential search terms. This second example shows how to precalculate these suggestions. In this example, we will search for the term "foobar". The structure to support the search first needs to be created using the technology disclosed. Then the search is processed using the category theory concepts of pushouts, colimits, cofibres, contravariant, and cocategories, which are the duals of pullbacks, limits, fibres, functors, and categories, respectively, on the technology disclosed.

We start with a dictionary of potential search terms. This may be any set of strings, such as person names, chemicals, etc. From this we can generate the set of prefixes, and for each prefix we will retain the set of words from our search terms which can "complete" it.

We represent this with a fibre where the under category is the category of prefixes. Each object is a prefix of a search term, where a prefix may have zero or more characters lopped off from the end of a search term. For the case of "foobar", the prefixes are foobar, fooba, foob, foo, fo, f, and the empty prefix. The only morphisms are "drop", where drop(0) is id, drop(1) drops the last character, and all other morphisms are formed by composition. Not surprisingly, the empty prefix is a limit. A search fibre 718 can be created by FreeMonoid.inject 230 and FreeMonoidReduce 240.

The over category is the product of the free monoid over search terms and integers. The first element has a set of search terms which share a prefix that has a length stored in the second element, the integer. The basic morphism is the pair (inject,decrement) 722.

Suppose we have "foobar", "foobaz", and "foob" as potential search terms. Then the under category will have the object "foob" 730 and the over category will have the object ([foobar,foobaz,foob],4) 706. It will also have the object ([foobar,foobaz],5) 704, which is over fooba 729. The injection of ([foobar,foobaz],5) ([foobar,foobaz,foob], 4) works because [foobar,foobaz] is a subset of [foobar,foobaz,foob], and decrement(5)=4.

Considering each node of the upper category as a pullback, we can generate the entire fibre by simply applying all the morphisms. Since the lower category has a limit, this terminates.

The interesting operation here is generating the nodes of the over category. In a non-parallel implementation we can consider the fibre as a hash table from the prefix to set of words. Then we can get from any node in the upper category to the next one by crossing the fibre (i.e., just take the prefix), moving one step along the bottom, and then moving back to the over category through the hash table.

In a parallel implementation using Spark, from any word we generate all the different prefix word pairs and then Spark's group by operation brings them all together.

The morphism of the lower category, in this example, is "drop" 724, which drops the last letter from the object in the category. The word "foobar" 728 is the first object. As the morphism 724 is applied to the objects to the limit of the series 736, the last letter is removed at each iteration until the object is a null string 738.

The functor 720 in this example identifies the prefix of characters to be used in the free monoid 702. Including the first 6 characters of the prefix results in the term "foobar" alone as a member of the free monoid 702. The second object 729 is the result of the first object 728 having the morphism 724 applied to it. The functor in this case includes the first 5 characters in the prefix of the second object 729, resulting in the free monoid 704 containing both "foobar" and "foobaz" since the sixth character is not included in the filter.

The injection 722 is different from the morphism 724. The morphism 724 drops the last character of a string. The injection 722 inserts the contents of one list into the contents of the larger list at the next step. This pipeline of injection 722 continues until you reach the colimit 716 of the free monoids, which includes all the words in our "universe. These all the words in the universe are represented by "{ }" in FIG. 7. In this example, the object 738 is a null string with a functor that indicates a prefix of zero characters, which defines a free monoid containing the universe of terms available in the search pool 716.

No entries have been made yet identifying the search criteria. So far, we have merely mapped the new morphism and functor to the technology disclosed. In this example, as a user begins typing characters, the first character they type is the letter "f" 734. This process generates the structure for associating a set of words with its prefixes. It turns out that this structure is also appropriate for generating the suggestions at runtime. If we move from the fibre to the cofibre, we start, not with the words, but with the empty prefix, which is paired with the set of all search terms (the colimit 716 of the cofibre 726 category), and each drop 724 from the original category is associated with a morphism for the letter dropped. In this way we can move from an empty search term to the set of suggestions as the user types the letters. Each letter moves from one object to another in the under category, which indicates (across the cofibre) the associated object of the over category.

Computer System

Figure 8:
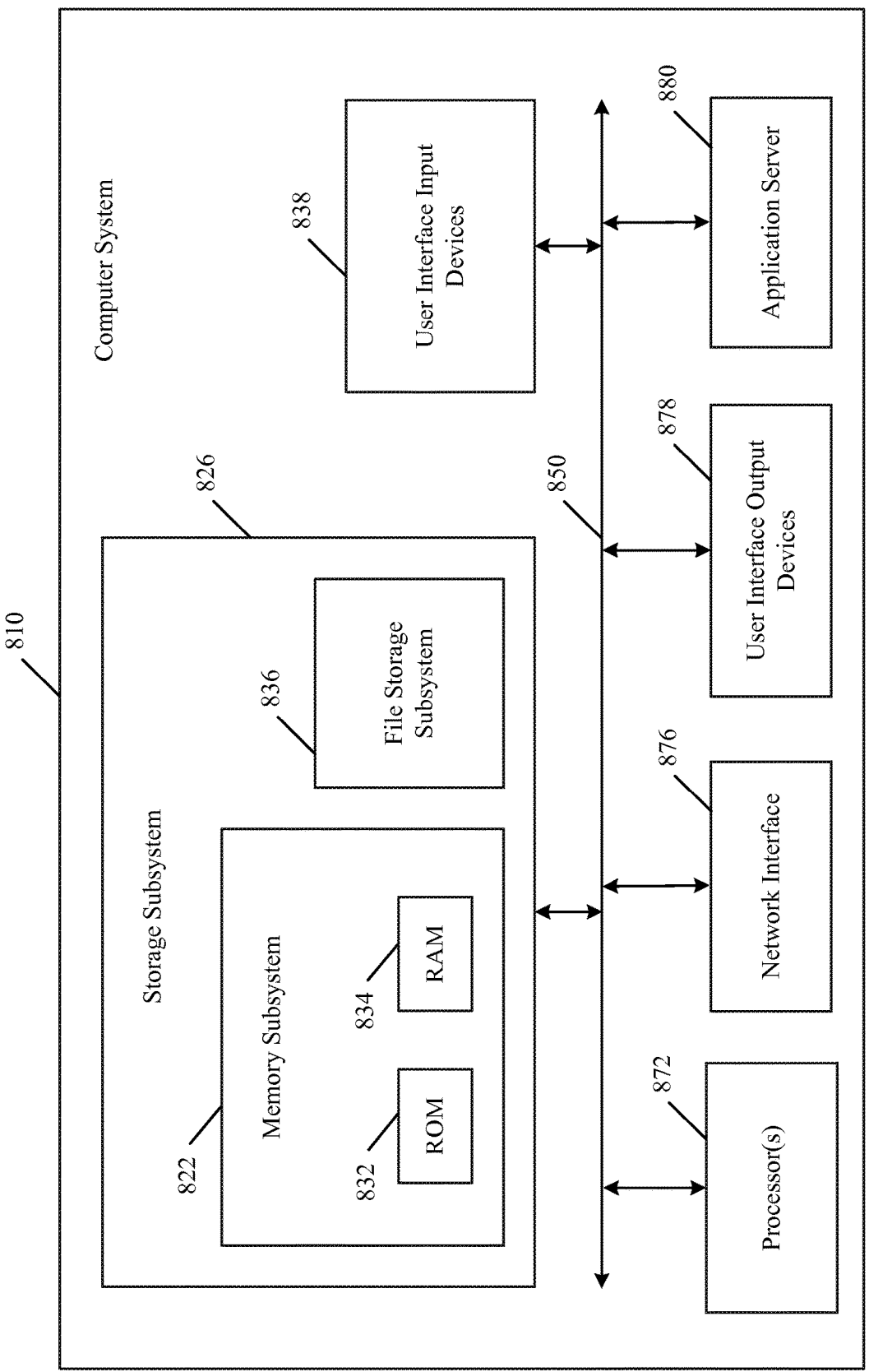
FIG. 8 illustrates a search function that is executed using the technology disclosed.

FIG. 8 is a block diagram of an example computer system 800. FIG. 8 is a block diagram of an example computer system, according to one implementation. The processor can be an ASIC or RISC processor. It can be an FPGA or other logic or gate array. It can include graphic processing unit (GPU) resources. Computer system 810 typically includes at least one processor 872 that communicates with a number of peripheral devices via bus subsystem 850. These peripheral devices can include a storage subsystem 826 including, for example, memory devices and a file storage subsystem, customer interface input devices 838, customer interface output devices 878, and a network interface subsystem 876. The input and output devices allow customer interaction with computer system 810. Network interface subsystem 876 provides an interface to outside networks, including an interface to corresponding interface devices in other computer systems.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all different types of devices and ways to input information into computer system 810.

User interface output devices 878 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all different types of devices (tablets, cell phones, smart phones, PCs, laptops) and ways to output information from computer system 810 to the user or to another machine or computer system.

Storage subsystem 826 stores programming and data constructs that provide the functionality of some or all of the modules and methods described herein. These software modules are generally executed by processor 872 alone or in combination with other processors.

Memory 822 used in the storage subsystem can include a number of memories including a main random access memory (RAM) 834 for storage of instructions and data during program execution and a read only memory (ROM) 832 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 826, or in other machines accessible by the processor.

Bus subsystem 850 provides a mechanism for letting the various components and subsystems of computer system 810 communicate with each other as intended. Although bus subsystem 850 is shown schematically as a single bus, alternative implementations of the bus subsystem can use multiple busses. Computer system 810 can be of varying types including a workstation, server, computing cluster, blade server, server farm, or any other functional processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8. Application server 880 can be a framework that allows the applications of computer system 600 to run, such as the hardware and/or software, e.g., the operating system.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Distributed Computing Environment

Figure 9:
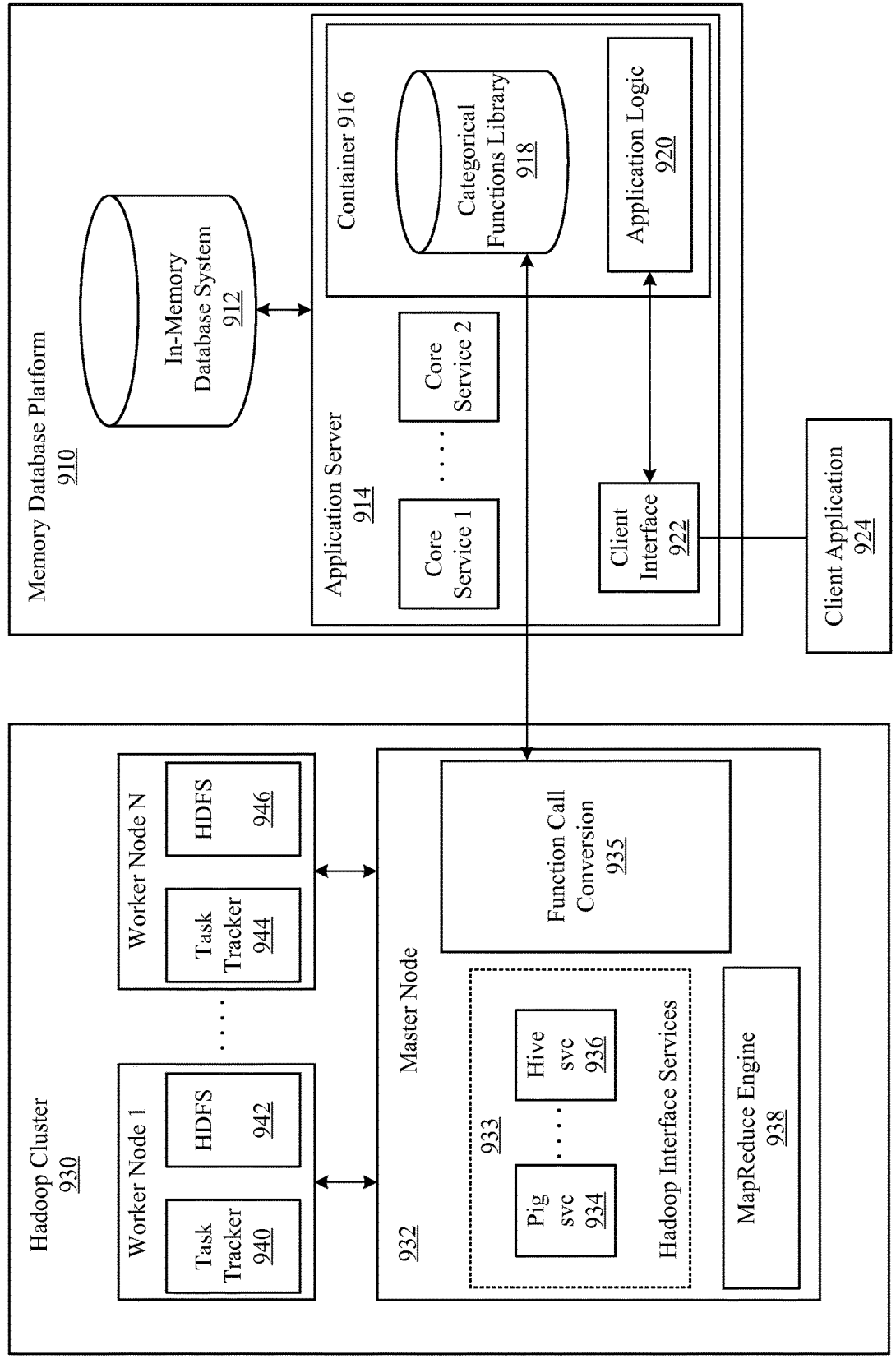
FIG. 9 is a block diagram illustrating a distributed computing environment according to an example implementation

FIG. 9 is a block diagram illustrating a distributed computing environment 900 according to an example implementation. Environment 900 includes a memory database platform 910 coupled to a client application 924. Hadoop cluster 930 is coupled to the memory database platform 910 and provides distributed processing across multiple database nodes. This architecture illustrated in FIG. 9 for environment 900 can allow requests for either in-memory database system processing and/or Hadoop processing to be handled (e.g., received and/or processed) within one system.

According to an example implementation, memory database platform 910 can include an in-memory database system 912 to provide in-memory database services, such as rapid storage and retrieval of data from main memory. Memory database platform 910 can also include an integrated application server 914 that can be integrated with the in-memory database system 912. By application server 914 being integrated with the in-memory database system 912, this can include for example, a direct inter-process communication between application server 914 and system 912 (e.g., processes of server 914 and system 912 in direct communication and), application server 914 and system 912 located on same computer or server (on same physical machine), use of shared memory between the application server 914 and system 912 (e.g., where both application server 914 and system 912 can read and write to a same memory), and/or the possibility to move processing steps from the application server 914 to in-memory database system 912. These are merely some examples of how application server 914 can be integrated with in-memory database system 912, and other examples can be provided.

Application server 914 can generally provide application-related services, such as, for example, providing web pages to one or more client applications, security/authentication, receiving and processing resource requests and other services. According to an example implementation, application server 914 can include a client interface 922 for providing an interface to client application 924. Client application 924 can include, for example, a web browser or other client application. Client interface 922 can provide services to clients/client applications, such as security and/or authentication services. Client interface 922 can also serve or send web pages to a client (such as to client application 924), and can receive resource (or processing) requests, such as, Hyper-Text Transfer Protocol (HTTP) requests (e.g., HTTP Get requests, or HTTP Post requests), or other requests. The terms resource request and processing request can be used interchangeably herein. Client interface 922 can then forward the resource request to application logic 920, which can be logic or software running as a JavaScript application running or executing within script container 916, according to one example implementation. Alternatively, resource requests can be received by application logic 920 from other applications running within the application server, e.g., as a JavaScript application running within script container 916, or from other applications within application server 914.

After receiving a processing request or a resource request from an application, application logic 920 of application server 914 can issue or send one or more resource requests or function calls for the categorical functions described above that request processing or service, to the in-memory database system 912 and/or the Hadoop cluster 930, depending on what processing is required to fulfill or complete the received resource request. Therefore, application logic 920 can first determine whether a request or function call should be sent to either the in-memory database system 912 and/or the Hadoop cluster 930 to fulfill the received resource request. Such request or function call can then be generated by the application logic 920 and sent to either the in-memory database system 912 or the Hadoop cluster 930 for processing. In some implementations, one or more processing steps can be performed by both the in-memory database system 912 and the Hadoop cluster 930 in order to fulfill or complete processing for the initially received resource request from the client. According to an example implementation, after processing is completed, application server 914 can return a result to the requesting application (e.g., client application 924), via client interface 922, in response to the received resource request or processing request.

For example, if the resource request requires processing by the in-memory database system 912, the application logic 920 can issue or send a resource request, e.g., via a categorical function, to one or more of the core services, such as to core service 1, core service 2 (not shown), and/or core service N within application server 914. The core service that receives the processing categorical function can then perform the requested categorical function on or via the in-memory database system 912. For example, some of the core services can provide read and write operations to the in-memory database system 912, and/or to perform other processing, to be performed on or by the in-memory database system 912. For example, in response to a processing request, core service 1 can perform structured query language (SQL) processing or issue a SQL request, e.g., to perform a read from or write to in-memory database system 912.

For example, a HTTP Post request can be received by client interface 922 based on a web page served to client application 924. The Post request can include, as parameters, a first name and a last name entered by a user via client application 924. Application logic 920 can receive the Post request, e.g., forwarded by client interface 922. Application logic 920 can then, for example, store this information (the received word, count) in the in-memory database system 912, e.g., by sending a categorical function to one of the core services within application server 914 to store such data, in the event that such data should be stored in the in-memory database system 912. This data (word and count) could then be stored in the in-memory database system 912, e.g., via SQL operation performed by one of the core services.

Hadoop cluster 930 can include multiple nodes to provide distributed processing and/or parallel processing and distributed storage of data. In one example implementation, each node (e.g., master nodes and worker nodes) can include a processor, memory, and other related hardware and software. While only one Hadoop cluster 930 is shown, any number of Hadoop clusters can be provided to allow distributed or parallel processing.

In the example shown in FIG. 9, Hadoop cluster 930 can include a plurality or group of (e.g., N) worker nodes, such as worker node 1, worker node 2 (not shown), . . . worker node N, where each node can process and store data, such that the Hadoop cluster 930 can perform distributed or parallel functional processing on data. Each worker node can include a task tracker to receive and process a task from the MapReduce engine 938 of the master node 932. Each worker node can also include a Hadoop distributed file system (HDFS) to store data, which allows data to be stored in a distributed manner across multiple worker nodes. As an example, worker nodes 1 and N can include task trackers 940 and 944, respectively, and can include Hadoop distributed file systems (HDFSs) 942 and 946, respectively.

In the example shown in FIG. 1, Hadoop cluster 930 also includes a master node 932, which includes a MapReduce engine 938. MapReduce engine 938 can include a job tracker (not shown) for receiving MapReduce jobs from applications, and dividing a job into a number of tasks (or sub-jobs). The MapReduce engine 938 can then distribute the tasks among or to each of the worker nodes, e.g., worker node 1, worker node 2 (not shown), . . . worker node N. Each worker node can then perform the requested task or sub-job, and can store the task results in its respective HDFS. The job tracker of the MapReduce engine 938, in some cases, can then collect the processing results as one or more result files from the worker nodes and can write or store the processing results to application server 914 or to in-memory database system 912. According to one example implementation, the master node 932 can provide or report the processing result back to the client application that submitted the MapReduce job request.

In another example implementation, a callback function can be submitted to master node 932 as a MapReduce job to request that processing results be stored in the in-memory database system 912. Master node 932 can then issue a new set of tasks to each of the worker nodes where the processing results are stored to cause these worker nodes to write or store the processing results directly to the in-memory database system 912. Alternatively, the Hadoop worker nodes can provide the processing results to the application server 914, e.g., via function call conversion 935. Once application server 914 receives the processing results from the Hadoop worker nodes, the application server can 914 send a request to the core services to store these processing results in the in-memory database system 912. Thus, the processing results from the Hadoop worker nodes can be stored in the in-memory database system 912 via application server 914.

According to an example implementation, one or more Hadoop interface services 933 can be provided that can provide applications with access to Hadoop services, while, at least in some cases, abstracting some of the details of Hadoop, for example. Two example Hadoop interface services 933 include a Pig service 934 and a Hive service 936.

Pig service 934 is a service built on top of Hadoop which abstracts some of the details of Hadoop from an application. Pig service 934 receives requests written in a language known as "Pig Latin," and can generate one or more MapReduce jobs based on received Pig commands or Pig requests written in Pig Latin. In some cases, a collection or group of Pig requests or commands can be performed as one MapReduce job, for example. Pig Latin abstracts the details of the MapReduce requests into a higher level language, so that it can be easier for applications to submit requests for Hadoop processing via the Pig service 934.

Hive service 936 is a data warehouse service built on top of the Hadoop cluster 930 which facilitates querying and managing large datasets residing in a distributed file system. For example, with Hive service 936, structured data in HDFS can be modeled as relational tables and Hive service 936 can perform structured query language (SQL)-like operations on them with multiple chained MapReduce jobs. Hive service 936 can receive requests, which can be known as Hive queries or a Hive Query Language (Hive QL) requests, for example.

According to an example implementation, a Hadoop categorical function library 918 is provided within or on application server 914 that includes a group or library of Hadoop categorical functions described above. Hadoop categorical function library 918 provides a connection between one or more applications (e.g., applications which can be running within script container 916, or application logic 920, or other applications) and the Hadoop interface services 933 (e.g., Pig service 934, Hive service 936) without requiring the application to know all of the details of the underlying Hadoop interface services 933. Thus, some of the specific details of Hive service 936 or Pig service 934 (and other Hadoop interface services 933) can be abstracted or hidden from an application by calling one or more functions of the Hadoop categorical function library 918, instead of directly submitting Hive requests or Pig requests to Hive service 936 or Pig service 934, respectively.

The Hadoop categorical function library 918 is a collection or library of categorical functions described above. Each categorical function in the categorical function library 918 can map to a corresponding Hive request or Pig request. Therefore, to allow an application to access Hive/Pig services (or to access Hadoop services via Pig service/Hive service), an application or application logic 920 can generate a Hadoop categorical function call, which is a call to one of the categorical functions in the Hadoop categorical function library 918. This can allow an application within application server 914, or application logic 920, to obtain access to services of Hadoop cluster 930 via Pig service 934 or Hive service 936 by issuing a call to a categorical function without the requesting application or application logic 920 needing to know all of the details of Pig service 934 or Hive service 936, and e.g., without requiring to the requesting application/application logic 920 to handle any errors from such Hive/Pig services. The categorical function library 918 also allows an application, or application logic 920, to issue or send processing requests (or resource requests) to either the in-memory database system 912 (e.g., by sending a processing request or function call to one of the core services) and/or send a request for processing by the Hadoop cluster 930 by generating and sending a Hadoop categorical function call to function call conversion service 935.

In response to receiving a Hadoop categorical function call (e.g., from application logic 920 or an application running within script container 916 or elsewhere within application server 914), the Hadoop categorical function library 918 can forward the Hadoop categorical function call to function call conversion service 935. According to an example implementation, function call conversion service 935 can be a program or logic that can, for example, reside or run/execute on master node 932, or other node or location. According to an example implementation, function call conversion service 935 can convert the received Hadoop categorical function call to a corresponding Hadoop interface service function call, e.g., based on one or more parameters (such as function name and other parameters) of the received Hadoop categorical function call. A Hadoop categorical function call can include the name of the Hadoop categorical function, and one or more additional parameters. For example, function call conversion service 935 can convert the received Hadoop function call to a corresponding Pig request or Hive request. In other words, by performing such function call conversion, function call conversion service 934 can generate a Hadoop interface service function call (e.g., Pig request or Hive request) based on a received Hadoop categorical function call.

For example, a Hadoop categorical function call can be written as: Hadoop_categorical_function_name (parameter1, parameter2, parameter3), wherein Hadoop_categorical_function_name is a name of the Hadoop categorical function, and parameter1, parameter2 and parameter3 are additional parameters of this function call. The function call conversion service 935 can generate a corresponding Pig or Hive function call, such as: Pig_function_name (parameter2, parameter3, parameter4), where two of the three parameters of the Hadoop function call (parameter2 and parameter3) are also parameters of the corresponding Pig function call, but parameter4 is a new parameter (parameter4 is not present or not provided via the Hadoop categorical function call). Function call conversion 935 can also handle any errors that can be generated by the Pig service 934 or Hive service 936.

Function call conversion service 935 then forwards the generated Hadoop interface service function call (e.g., Pig function call, or Hive function call) to the identified or corresponding Hadoop interface service. For example, a generated Pig function call or Pig request would be forwarded to the Pig service 934, while a generated Hive function call or Hive request would be forwarded to the Hive service 936.

The receiving Hadoop interface service (e.g., Pig service 934 or Hive service 936) can then generate a MapReduce job (or one or more MapReduce jobs) based on the received Hadoop interface service function call. For example, Hive service 936 can generate a MapReduce job for each received Hive function call or Hive request received from function call conversion service 935. Similarly, Pig service 934 can generate a MapReduce job for each received Pig function call or each Pig request from function call conversion service 935. Alternatively, Pig service 934 can receive multiple Pig function calls or multiple Pig requests, and can generate just one or two MapReduce jobs based on a group of, e.g., 4, 5, 6, . . . Pig function calls or Pig requests, since Pig service 934 can have the capability of combining multiple Pig requests into a single MapReduce job, according to an example implementation.

As noted, a MapReduce engine 938 of master node 932 can receive the MapReduce job from the Pig service 934 or Hive service 936. The MapReduce engine 938 can then divide the MapReduce job into a plurality of tasks, and then distribute the tasks to each of a plurality of worker nodes. The result file (or result files that are generated by worker nodes processing the tasks) can then be returned to the function call conversion service 935, the application logic 920, the in-memory database system 912, and/or the application server 914, as examples. According to an example implementation, a callback function call can be sent by the function call conversion service 935 to one of the Hadoop interface services 933 requesting that the processing result file be stored directly into the in-memory database system 912, e.g., where the function call can identify an address, a table, or a resource location where the result file should be stored in the in-memory database system 912. In this example, after processing the tasks for the MapReduce job, the worker nodes can write or store their result files in the in-memory database system 912, e.g., in the location or file identified by the callback function.

An example will now be described that can involve accesses to both the in-memory database system 912 and the services of the Hadoop cluster 930 via the Hadoop interface services 932. According to an example, an HTTP request can be received by client interface 922 from client application 924 (e.g., web browser) that includes a user's first name and last name. The HTTP request is forwarded to the application logic 920. Application logic 920 then issues a read request to the core services to perform a table lookup in the in-memory database system 912 to obtain a user_ID (or user identification number) associated with the user's name (first name, last name) received in the HTTP request. The core services submit a SQL request to the in-memory database system 912 to obtain the user_ID corresponding to the user's first name and last name. The user_ID is then returned by the in-memory database system 912 to the application logic 920 via the core services.

Next, according to an illustrative example, one or more requests for Hadoop processing can be sent by application logic 920 to one or more of the Hadoop interface services 933 in order for the application logic 920 to obtain from the Hadoop cluster 930 a list of product IDs for top 10 recommended products for the user associated with the received user_ID. For example, application logic 920 can generate and send one or more, or even a group (or plurality) of Hadoop function calls, to the Hadoop categorical function library 918. The Hadoop categorical function library 918 can then forward each of the Hadoop categorical function calls to the function call conversion service 935.

For example, application logic 920 can generate and submit, via the Hadoop categorical function library 918, a group (or plurality) of Hadoop categorical function calls to the function call conversion service 935 including the four example Hadoop categorical function calls listed below in Table 1. According to an example implementation, function call conversion service 935 can then generate a corresponding Pig Latin function call (or Pig request) for each of the four Hadoop categorical function calls, which are sent to Pig service 934, so that Hadoop cluster 930 can perform one or more requested functions.

Application logic can then provide the results of the requested functions to the client interface 922. Client interface 922 can then generate and serve a web page to client application 924 that displays the results to the user.

Multi-Tenant Environment

Figure 10:
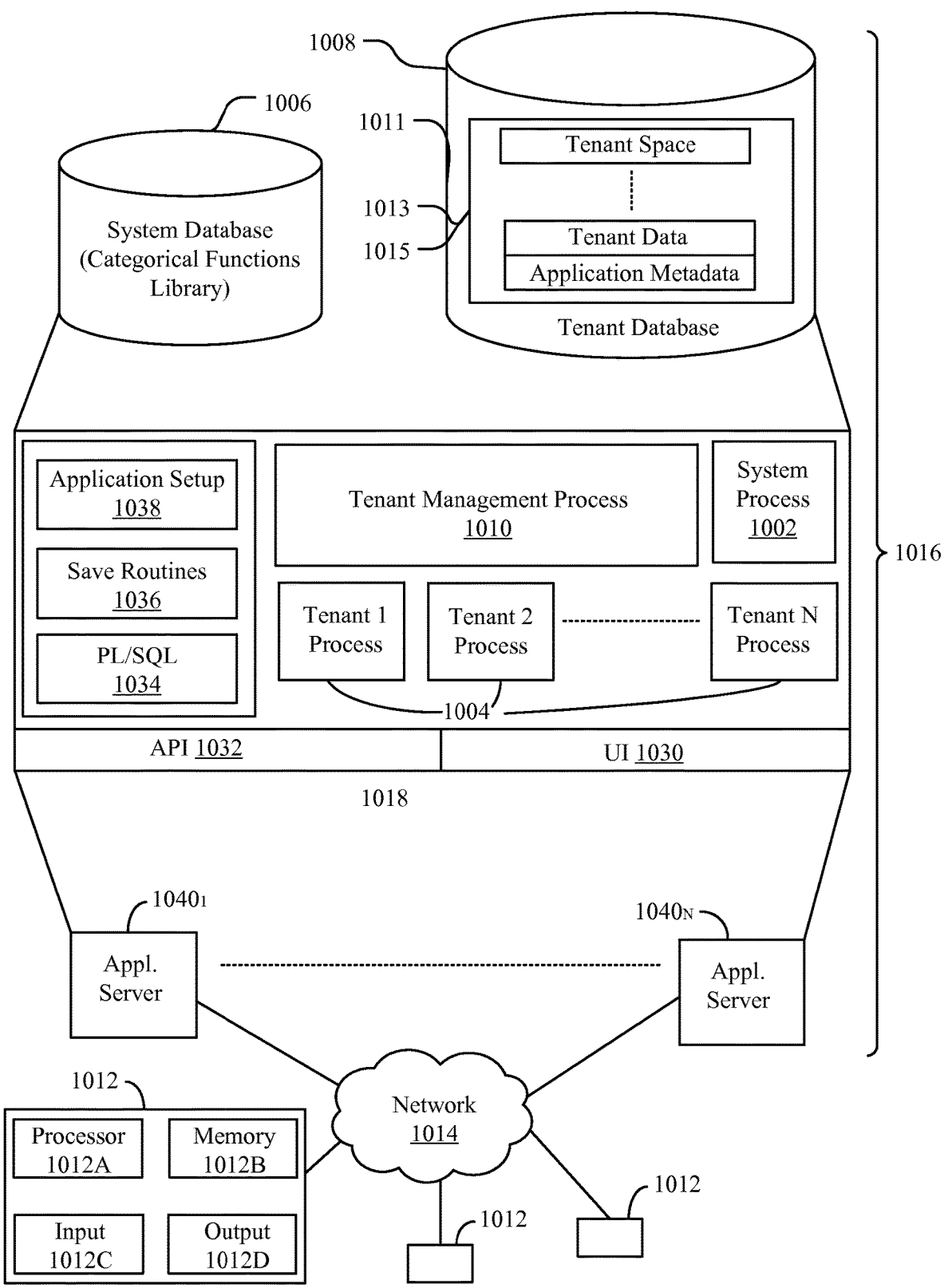
FIG. 10 shows a block diagram of one implementation of a multi-tenant environment.

FIG. 10 shows a block diagram of one implementation of a multi-tenant environment 1000. FIG. 10 also shows that user system 1012 may include processor system 1012A, memory system 1012B, input system 1012C, and output system 1012D. FIG. 10 includes network 1014, system database 1006, and tenant database 1008. FIG. 10 also shows tenant database 1008 with tenant storage 1011, user storage 1013 and application metadata 1015, user interface (UI) 1030, application-programming interface (API) 1032, PL/SOQL 1034, save routines 1036, application setup mechanism 1038, applications servers $1040_1$-$1400_N$, tenant management process space 1010, system process space 1002, and tenant process spaces 1004. In other implementations, environment 1000 may not have the same elements as those listed above and/or may have other/different elements instead of, or in addition to, those listed above.

Regarding user system 1012, processor system 1012A may be any combination of processors such as a digital signal processor (DSP), microprocessor, microcontroller, central procession unit (CPU) or graphics processing unit (GPU), application specific integrated circuit (ASIC), reduced instruction set computing (RISC) or field-programmable gate array (FPGA). Memory system 1012B may be any combination of one or more memory devices, short term, long term memory, and/or volatile memory like Read Only Memory (ROM), Random Access Memory (RAM), flash memory and disk drive among others. Input system 1012C may be any combination of input devices, such as keyboards, mice, trackballs, scanners, cameras, and/or interfaces to networks. Output system 1012D may be any combination of output devices, such as monitors, printers, and/or interfaces to networks.

Each application server 1040 may be configured to tenant database 1008 and system database 1006 therein to serve requests of user systems 1012. The tenant database 1008 might be divided into individual tenant storage 1011 and user storage 1013, which can be either a physical arrangement and/or a logical arrangement of data. User storage 1013 and application metadata 1015 might be similarly allocated for each user. For example, a copy of a user's most recently used (MRU) items might be stored to user storage 1013. Similarly, a copy of MRU items for an entire organization that is a tenant might be stored to tenant storage 1011. A UI 1030 provides a user interface and an API 1032 provides an application programming interface to system 1016 resident processes to users and/or developers at user systems 1012. The tenant data and the system data may be stored in various databases, such as SAP or Oracle databases.

An application setup mechanism supports application developers' creation and management of applications, which may be saved as metadata into tenant data storage 1013 by save routines 1036 for execution by subscribers as tenant process spaces 1004 managed by tenant management process 1010. Invocations to such applications may be coded using PL/SQL 1034 that provides a programming language style interface extension to API 1032. Invocations to applications may be detected by system processes, which manage retrieving application metadata 1015 for the subscriber making the invocation and executing the metadata as an application in a virtual machine.

Each application server 1040 may be communicably coupled to database systems, e.g., having access to system database 1006 and tenant database 1008, via a different network connection. For example, one application server $1040_1$ might be coupled via the network 1014 (e.g., the Internet), another application server $1040_2$ might be coupled via a direct network link, and another application server $1040_N$ might be coupled by yet a different network connection.

In some MTEs, tenants may be allowed to create and store custom objects, or they may be allowed to customize standard entities or objects, for example by creating custom fields for standard objects, including custom index fields. For example, all custom data rows are stored in a single multi-tenant physical table, which may contain multiple logical tables per organization. In some implementations, multiple "tables" for a single customer may actually be stored in one large table and/or in the same table as the data of other customers.

Particular Implementations

In one implementation, a method of improving parallel functional processing is described. The method includes performing data transformations in a functional processing pipeline using at least one instance or composition combining each of categorical functions in a group including TupleMaker, FreeMonoidReduce, TupleWithList, MonoidTupleListMerge, and MonoidTupleListEvaluate. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The TupleMaker categorical function transforms a free monoid over strings into a free monoid over tuples including at least one key-value pair in each tuple. In one implementation, the TupleMaker creates at least part of the tuples by combining consecutive elements of the free monoid over strings into the tuples. In another implementation, the TupleMaker creates at least part of the tuples by combining a pre-determined value with each element in the free monoid over strings.

The FreeMonoidReduce categorical function merges a nested free monoid over tuples into one free monoid over tuples, thereby reducing a nesting depth of the nested free monoid over tuples.

The TupleWithList categorical function transforms one element in each tuple of the one free monoid over tuples into list of one element in a free monoid over tuples with an embedded list element. In one implementation, the TupleWithList categorical function converts at least one element in each tuple of the one free monoid over tuples from a single element into an embedded list element that includes one list value and accepts additional list values.

The MonoidTupleListMerge categorical function merges consecutive tuples of the free monoid over tuples with the embedded list element. In one implementation, the MonoidTupleListMerge categorical function, for consecutive tuples having matching key elements, consolidates the embedded list elements of the consecutive tuples into a single embedded list element holding a plurality of list values in a single consolidated tuple.

The MonoidTupleListEvaluate categorical function transforms a plurality of list values into a single value based on a parameterized operation.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in other sections such as Introduction, Main, Infix Operators, Computer System, and others.

In one implementation, the method further includes applying a plurality of instances of a composition-operator to compose the categorical functions to yield at least one composed function. The categorical functions satisfy a categorical composition and associative principle.

In some implementations, the method further includes representing the composition operator by "||".

In one implementation, the parameterized operation applied by the MonoidTupleListEvaluate categorical function is summation. In another implementation, the parameterized operation applied by the MonoidTupleListEvaluate categorical function is multiplication. Other examples of parameterized operation include string concatenation, matrix addition and multiplication, or computing maxima and minima.

In some implementations, the method further includes using a StringParse function to transform a string into a free monoid over strings as a list of tokens.

In other implementations, the method further includes storing the free monoid over strings in a linked list of at least key-value pairs.

In some other implementations, the method further includes in the functional processing pipeline using at least one instance of each function in a second group including FreeMonoidInject, SortList, and FreeMorphMophism. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The FreeMonoidInject function applies the TupleMaker to a plurality of free monoids over strings and to generate a nested free monoid over tuples.

The SortList function sorts the free monoid over tuples or the free monoid over tuples with the embedded list element.

In one implementation, the SortList function uses a key in each tuple element as at least part of a sort key.

The FreeMorphMorphism function transforms tuple elements of the free monoid over tuples with the embedded list element, having a key and a single value list element, into a list of key-value pairs.

In one implementation, the method further includes an input operator that transforms data by accepting a set of files as input and arranging the files as a free monoid over strings.

In one implementation, the method further includes an input operator that transforms data by accepting at least one data object as input and arranging string data in the data object as a free monoid over strings.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In a further implementation, a method of improving parallel functional processing is described. The method includes performing data transformations in a functional processing pipeline using at least one instance or composition combining each of categorical functions in a group including TupleMaker, FreeMonoidInject, FreeMonoidReduce, TupleWithList, SortList, MonoidTupleListMerge, MonoidTupleListEvaluate, and FreeMorphMorphism. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The TupleMaker categorical function transforms a free monoid over strings into a free monoid over tuples including at least one key-value pair in each tuple. In one implementation, the TupleMaker creates at least part of the tuples by combining consecutive elements of the free monoid over strings into the tuples. In another implementation, the TupleMaker creates at least part of the tuples by combining a pre-determined value with each element in the free monoid over strings.

The FreeMonoidInject function applies the TupleMaker to a plurality of free monoids over strings and to generate a nested free monoid over tuples.

The FreeMonoidReduce categorical function merges a nested free monoid over tuples into one free monoid over tuples, thereby reducing a nesting depth of the nested free monoid over tuples.

The TupleWithList categorical function transforms one element in each tuple of the one free monoid over tuples into list of one element in a free monoid over tuples with an embedded list element. In one implementation, the TupleWithList categorical function converts at least one element in each tuple of the one free monoid over tuples from a single element into an embedded list element that includes one list value and accepts additional list values.

The SortList function sorts the free monoid over tuples or the free monoid over tuples with the embedded list element. In one implementation, the SortList function uses a key in each tuple element as at least part of a sort key.

The MonoidTupleListMerge categorical function merges consecutive tuples of the free monoid over tuples with the embedded list element. In one implementation, the MonoidTupleListMerge categorical function, for consecutive tuples having matching key elements, consolidates the embedded list elements of the consecutive tuples into a single embedded list element holding a plurality of list values in a single consolidated tuple.

The MonoidTupleListEvaluate categorical function transforms a plurality of list values into a single value based on a parameterized operation.

The FreeMorphMorphism function transforms tuple elements of the free monoid over tuples with the embedded list element, having a key and a single value list element, into a list of key-value pairs.

This method and other implementations of the technology disclosed can include one or more of the following features and/or features described in connection with additional methods disclosed.

In one implementation, the method further includes applying a plurality of instances of a composition-operator to compose the categorical functions to yield at least one composed function. The categorical functions satisfy a categorical composition and associative principle.

In some implementations, the method further includes representing the composition operator by "||".

In one implementation, the parameterized operation applied by the MonoidTupleListEvaluate categorical function is summation. In another implementation, the parameterized operation applied by the MonoidTupleListEvaluate categorical function is multiplication. Other examples of parameterized operation include string concatenation, matrix addition and multiplication, or computing maxima and minima.

In some implementations, the method further includes using a StringParse function to transform a string into a free monoid over strings as a list of tokens.

In other implementations, the method further includes storing the free monoid over strings in a linked list of at least key-value pairs.

In some other implementations, the method further includes in the functional processing pipeline using at least one instance of each function in a second group including FreeMonoidInject, SortList, and FreeMorphMophism. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The FreeMonoidInject function applies the TupleMaker to a plurality of free monoids over strings and to generate a nested free monoid over tuples.

The SortList function sorts the free monoid over tuples or the free monoid over tuples with the embedded list element. In one implementation, the SortList function uses a key in each tuple element as at least part of a sort key.

The FreeMorphMorphism function transforms tuple elements of the free monoid over tuples with the embedded list element, having a key and a single value list element, into a list of key-value pairs.

In one implementation, the method further includes an input operator that transforms data by accepting a set of files as input and arranging the files as a free monoid over strings.

In one implementation, the method further includes an input operator that transforms data by accepting at least one data object as input and arranging string data in the data object as a free monoid over strings.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of improving parallel functional processing is described. The method includes performing data transformations in a functional processing pipeline using at least one instance or composition combining each of categorical functions in a group consisting of TupleMaker, FreeMonoidInject, FreeMonoidReduce, TupleWithList, SortList, MonoidTupleListMerge, MonoidTupleListEvaluate, and FreeMorphMorphism. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The TupleMaker categorical function transforms a free monoid over strings into a free monoid over tuples including at least one key-value pair in each tuple. In one implementation, the TupleMaker creates at least part of the tuples by combining consecutive elements of the free monoid over strings into the tuples. In another implementation, the TupleMaker creates at least part of the tuples by combining a pre-determined value with each element in the free monoid over strings.

The FreeMonoidInject function applies the TupleMaker to a plurality of free monoids over strings and to generate a nested free monoid over tuples.

The FreeMonoidReduce categorical function merges a nested free monoid over tuples into one free monoid over tuples, thereby reducing a nesting depth of the nested free monoid over tuples.

The TupleWithList categorical function transforms one element in each tuple of the one free monoid over tuples into list of one element in a free monoid over tuples with an embedded list element. In one implementation, the TupleWithList categorical function converts at least one element in each tuple of the one free monoid over tuples from a single element into an embedded list element that includes one list value and accepts additional list values.

The SortList function sorts the free monoid over tuples or the free monoid over tuples with the embedded list element. In one implementation, the SortList function uses a key in each tuple element as at least part of a sort key.

The MonoidTupleListMerge categorical function merges consecutive tuples of the free monoid over tuples with the embedded list element. In one implementation, the MonoidTupleListMerge categorical function, for consecutive tuples having matching key elements, consolidates the embedded list elements of the consecutive tuples into a single embedded list element holding a plurality of list values in a single consolidated tuple.

The MonoidTupleListEvaluate categorical function transforms a plurality of list values into a single value based on a parameterized operation.

The FreeMorphMorphism function transforms tuple elements of the free monoid over tuples with the embedded list element, having a key and a single value list element, into a list of key-value pairs.

This method and other implementations of the technology disclosed can include one or more of the following features and/or features described in connection with additional methods disclosed.

In one implementation, the method further includes applying a plurality of instances of a composition-operator to compose the categorical functions to yield at least one composed function. The categorical functions satisfy a categorical composition and associative principle.

In some implementations, the method further includes representing the composition operator by "∥".

In one implementation, the parameterized operation applied by the MonoidTupleListEvaluate categorical function is summation. In another implementation, the parameterized operation applied by the MonoidTupleListEvaluate categorical function is multiplication. Other examples of parameterized operation include string concatenation, matrix addition and multiplication, or computing maxima and minima.

In some implementations, the method further includes using a StringParse function to transform a string into a free monoid over strings as a list of tokens.

In other implementations, the method further includes storing the free monoid over strings in a linked list of at least key-value pairs.

In some other implementations, the method further includes in the functional processing pipeline using at least one instance of each function in a second group including FreeMonoidInject, SortList, and FreeMorphMophism. Other implementations may perform the data transformations in different orders and/or with different, fewer or additional categorical functions instead of, or in addition to, those listed above. Multiple categorical functions can be combined in some composite implementations. In other implementations, the different data transformations can be combined into single software modules and multiple software modules can run on the same hardware.

The subject matter described in this specification can be implemented as a method or as a system or using computer program products, tangibly implemented in information carriers, such as a CD-ROM, a DVD-ROM, a semiconductor memory, and a hard disk on distributed computing solutions like MapReduce, Apache Spark™, Apache Yarn™, Apache Hive™, Apache Shark™, Apache Storm™ or Tez™. Such computer program products may cause a functional processing apparatus to conduct one or more operations described herein.

In some implementations, the technology disclosed can be implemented in a MapReduce architecture. However, MapReduce flushes data to disk after each job, even the next job in the sequence will read the data back into memory. This round-trip disk I/O is a major source of inefficiency in MapReduce jobs over massive data sets.

Since MapReduce is only usable for batch-mode jobs, with recent support for incremental updates to files, the technology disclosed can be implemented to process events in real-time in clustered event processing systems like Apache Storm, according to other implementations.

In further implementations, the technology disclosed can implemented in distributed computing solutions that support both a batch-mode and streaming model and provide excellent performance compared to MapReduce, in part because they cache data in memory between processing steps. Examples of other distributed computing models on which the technology disclosed can be operated include at least one of Apache Spark™, Scalding™, Cascading™, Hamake™, Azkaban™, Nova™, and CloudWF™.

The FreeMonoidInject function applies the TupleMaker to a plurality of free monoids over strings and to generate a nested free monoid over tuples.

The SortList function sorts the free monoid over tuples or the free monoid over tuples with the embedded list element. In one implementation, the SortList function uses a key in each tuple element as at least part of a sort key.

The FreeMorphMorphism function transforms tuple elements of the free monoid over tuples with the embedded list element, having a key and a single value list element, into a list of key-value pairs.

In one implementation, the method further includes an input operator that transforms data by accepting a set of files as input and arranging the files as a free monoid over strings.

In one implementation, the method further includes an input operator that transforms data by accepting at least one data object as input and arranging string data in the data object as a free monoid over strings.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

What is claimed is:

1. A computer-implemented method comprising:
    transforming, by at least one processor of a functional processing pipeline running on multiple processors, a free monoid over strings into a free monoid over tuples including at least one key-value pair in each tuple;
    merging, by two or more processors of the functional processing pipeline running on multiple processors, the nested free monoid over tuples into one free monoid over tuples, thereby reducing a nesting depth of the nested free monoid over tuples;
    transforming, by two or more processors of the functional processing pipeline running on multiple processors, one element in each tuple of the one free monoid over tuples into a list of one element in a free monoid over tuples with an embedded list element;
    merging, by two or more processors of the functional processing pipeline running on multiple processors, consecutive tuples of the free monoid over tuples with the embedded list element; and
    transforming, by at least one processor of a functional processing pipeline running on multiple processors, a plurality of list values into a single value based on a parameterized operation.

2. The method of claim 1, wherein the transforming a free monoid over strings into a free monoid over tuples including at least one key-value pair in each tuple, the merging the nested free monoid over tuples into one free monoid over tuples, the transforming one element in each tuple of the one free monoid over tuples into a list of one element in a free monoid over tuples with an embedded list element, the merging consecutive tuples of the free monoid over tuples with the embedded list element, and the transforming a plurality of list values into a single value based on a parameterized operation are categorial functions, and further comprising:
    applying a plurality of instances of a composition-operator to compose the categorical functions to yield at least one composed function, wherein the categorical functions satisfy a categorical composition and associative principle.

3. The method of claim 2, further including representing the composition operator by "∥".

4. The method of claim 1, wherein the transforming a free monoid over strings into a free monoid over tuples including at least one key-value pair in each tuple creates at least part of the tuples by combining consecutive elements of the free monoid over strings into the tuples.

5. The method of claim 1, wherein the transforming a free monoid over strings into a free monoid over tuples including at least one key-value pair in each tuple creates at least part of the tuples by combining a pre-determined value with each element in the free monoid over strings.

6. The method of claim 1, wherein the transforming one element in each tuple of the one free monoid over tuples into a list of one element in a free monoid over tuples with an embedded list element converts at least one element in each tuple of the one free monoid over tuples from a single element into an embedded list element that includes one list value and accepts additional list values.

7. The method of claim 1, wherein the merging consecutive tuples of the free monoid over tuples with the embedded list element further comprises, for consecutive tuples having matching key elements, consolidating the embedded list elements of the consecutive tuples into a single embedded list element holding a plurality of list values in a single consolidated tuple.

8. The method of claim 1, wherein the parameterized operation applied by the transforming a plurality of list values into a single value based on a parameterized operation is summation.

9. The method of claim 1, further comprising transforming a string into a free monoid over strings as a list of tokens.

10. The method of claim 9, further including storing the free monoid over strings in a linked list of at least key-value pairs.

11. The method of claim 1, further comprising:
applying, by two or more processors of the functional processing pipeline running on multiple processors, the transforming a free monoid over strings into a free monoid over tuples including at least one key-value pair in each tuple to a plurality of free monoids over strings;
generating, by two or more processors of the functional processing pipeline running on multiple processors, a nested free monoid over tuples;
sorting, by two or more processors of the functional processing pipeline running on multiple processors, the free monoid over tuples or the free monoid over tuples with the embedded list element; and
transforming, by at least one processor of a functional processing pipeline running on multiple processors, tuple elements of the free monoid over tuples with the embedded list element, having a key and a single value list element, into a list of key-value pairs.

12. The method of claim 11, wherein the sorting the free monoid over tuples or the free monoid over tuples with the embedded list element function uses a key in each tuple element as at least part of a sort key.

13. The method of claim 1, further including an input operator that transforms data by accepting a set of files as input and arranging the files as a free monoid over strings.

14. The method of claim 1, further including an input operator that transforms data by accepting at least one data object as input and arranging string data in the data object as a free monoid over strings.

15. A non-transitory computer readable storage medium impressed with computer program instructions for programming one or more processors, which when executed on the processors, cause the processors to perform operations comprising:
transforming, by at least one processor of a functional processing pipeline running on multiple processors, a free monoid over strings into a free monoid over tuples including at least one key-value pair in each tuple;
merging, by two or more processors of the functional processing pipeline running on multiple processors, the nested free monoid over tuples into one free monoid over tuples, thereby reducing a nesting depth of the nested free monoid over tuples;
transforming, by two or more processors of the functional processing pipeline running on multiple processors, one element in each tuple of the one free monoid over tuples into a list of one element in a free monoid over tuples with an embedded list element;
merging, by two or more processors of the functional processing pipeline running on multiple processors, consecutive tuples of the free monoid over tuples with the embedded list element; and
transforming, by at least one processor of a functional processing pipeline running on multiple processors, a plurality of list values into a single value based on a parameterized operation.

16. The computer readable storage medium of claim 15, wherein the transforming a free monoid over strings into a free monoid over tuples including at least one key-value pair in each tuple, the merging the nested free monoid over tuples into one free monoid over tuples, the transforming one element in each tuple of the one free monoid over tuples into a list of one element in a free monoid over tuples with an embedded list element, the merging consecutive tuples of the free monoid over tuples with the embedded list element, and the transforming a plurality of list values into a single value based on a parameterized operation are categorial functions, and wherein the instructions cause the processors to perform operation further comprising applying a plurality of instances of a composition-operator to compose the categorical functions to yield at least one composed function, wherein the categorical functions satisfy a categorical composition and associative principle.

17. The computer readable storage medium of claim 15, wherein the instructions cause the processors to perform operation further comprising:
applying, by two or more processors of the functional processing pipeline running on multiple processors, the transforming a free monoid over strings into a free monoid over tuples including at least one key-value pair in each tuple to a plurality of free monoids over strings;
generating, by two or more processors of the functional processing pipeline running on multiple processors, a nested free monoid over tuples;
sorting, by two or more processors of the functional processing pipeline running on multiple processors, the free monoid over tuples or the free monoid over tuples with the embedded list element; and
transforming, by at least one processor of a functional processing pipeline running on multiple processors, tuple elements of the free monoid over tuples with the embedded list element, having a key and a single value list element, into a list of key-value pairs.

18. A system including multiple processors coupled to memory, the system configured to:
transform, using at least one processor of a functional processing pipeline running on the multiple processors, a free monoid over strings into a free monoid over tuples including at least one key-value pair in each tuple;
merge, using two or more processors of the functional processing pipeline running on the multiple processors, the nested free monoid over tuples into one free monoid over tuples, thereby reducing a nesting depth of the nested free monoid over tuples;

transform, using two or more processors of the functional processing pipeline running on the multiple processors, one element in each tuple of the one free monoid over tuples into a list of one element in a free monoid over tuples with an embedded list element;

merge, using two or more processors of the functional processing pipeline running on the multiple processors, consecutive tuples of the free monoid over tuples with the embedded list element; and transform, using at least one processor of a functional processing pipeline running on the multiple processors, a plurality of list values into a single value based on a parameterized operation.

19. The system of claim 18, wherein transforming a free monoid over strings into a free monoid over tuples including at least one key-value pair in each tuple, the merging the nested free monoid over tuples into one free monoid over tuples, transforming one element in each tuple of the one free monoid over tuples into a list of one element in a free monoid over tuples with an embedded list element, merging consecutive tuples of the free monoid over tuples with the embedded list element, and transforming a plurality of list values into a single value based on a parameterized operation are categorial functions, and wherein the system is further configured to apply a plurality of instances of a composition-operator to compose the categorical functions to yield at least one composed function, wherein the categorical functions satisfy a categorical composition and associative principle.

20. The system of claim 18, wherein the system is further configured to:

apply, using two or more processors of the functional processing pipeline running on the multiple processors, the transforming a free monoid over strings into a free monoid over tuples including at least one key-value pair in each tuple to a plurality of free monoids over strings;

generate, using two or more processors of the functional processing pipeline running on the multiple processors, a nested free monoid over tuples;

sort, using two or more processors of the functional processing pipeline running on the multiple processors, the free monoid over tuples or the free monoid over tuples with the embedded list element; and transform, using at least one processor of a functional processing pipeline running on the multiple processors, tuple elements of the free monoid over tuples with the embedded list element, having a key and a single value list element, into a list of key-value pairs.

* * * * *